US012197499B1

(12) United States Patent
Karnawat et al.

(10) Patent No.: US 12,197,499 B1
(45) Date of Patent: Jan. 14, 2025

(54) SCORING MEDIA PROGRAM PARTICIPANTS FOR PREDICTING POLICY COMPLIANCE

(71) Applicant: Amazon Technologies, Inc., Seattle, WA (US)

(72) Inventors: Rakshit Karnawat, Seattle, WA (US); Madhuri R. Marri, Cumming, GA (US); Mikesh Narendra Vora, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 196 days.

(21) Appl. No.: 17/750,870

(22) Filed: May 23, 2022

(51) Int. Cl.
*G06F 16/635* (2019.01)
*G06Q 50/00* (2024.01)
*G10L 15/08* (2006.01)

(52) U.S. Cl.
CPC .......... *G06F 16/635* (2019.01); *G06Q 50/01* (2013.01); *G10L 15/083* (2013.01)

(58) Field of Classification Search
None
See application file for complete search history.

(56) References Cited

U.S. PATENT DOCUMENTS

| | | |
|---|---|---|
| 5,832,435 A | 11/1998 | Silverman |
| 8,023,800 B2 | 9/2011 | Concotelli |
| 8,112,720 B2 | 2/2012 | Curtis |
| 8,560,683 B2 | 10/2013 | Funk et al. |
| 8,572,243 B2 | 10/2013 | Funk et al. |
| 8,768,782 B1 | 7/2014 | Myslinski |
| 8,850,301 B1 | 9/2014 | Rose |
| 9,003,032 B2 | 4/2015 | Funk et al. |
| 9,369,740 B1 | 6/2016 | Funk et al. |

(Continued)

FOREIGN PATENT DOCUMENTS

| | | |
|---|---|---|
| AU | 2013204532 B2 | 11/2014 |
| CA | 2977959 A1 | 9/2016 |

(Continued)

OTHER PUBLICATIONS

Arora, S. et al., "A Practical Algorithm for Topic Modeling with Provable Guarantees," Proceedings in the 30th International Conference on Machine Learning, JMLR: W&CP vol. 28, published 2013 (Year: 2013), 9 pages.

(Continued)

*Primary Examiner* — Hemant S Patel
(74) *Attorney, Agent, or Firm* — Athorus, PLLC

(57) ABSTRACT

When creators generate media content in accordance with media programs, the media content is evaluated to identify any number of violations of policies, and to generate scores representing a level of risk that the creators will violate one or more of the policies in the future. Subsequently, media content of the creators is transmitted to listeners in accordance with the scores. In addition to audio data of creators or transcripts of the audio data, scores may be generated based on images associated with the creators, titles or summaries of media programs, or reports received from listeners. Scores calculated for creators may increase or decrease over time, depending on numbers of violations of policies by such creators, or other factors, and be utilized with a goal of protecting listeners against exposure to harmful content.

20 Claims, 18 Drawing Sheets

(56) References Cited

U.S. PATENT DOCUMENTS

| | | | |
|---|---|---|---|
| 9,613,636 B2 | 4/2017 | Gibbon et al. | |
| 9,706,253 B1 | 7/2017 | Funk et al. | |
| 9,729,596 B2 | 8/2017 | Sanghavi et al. | |
| 9,781,491 B2 | 10/2017 | Wilson | |
| 9,872,069 B1 | 1/2018 | Funk et al. | |
| 10,015,589 B1 | 7/2018 | Ebenezer | |
| 10,083,169 B1 | 9/2018 | Ghosh et al. | |
| 10,091,547 B2 | 10/2018 | Sheppard et al. | |
| 10,110,952 B1 | 10/2018 | Gupta et al. | |
| 10,135,887 B1 | 11/2018 | Esser et al. | |
| 10,140,364 B1 | 11/2018 | Diamondstein | |
| 10,178,422 B1 | 1/2019 | Panchaksharaiah et al. | |
| 10,178,442 B2 | 1/2019 | Shkedi | |
| 10,264,213 B1 | 4/2019 | Sculley | |
| 10,313,726 B2 | 6/2019 | Woods et al. | |
| 10,356,476 B2 | 7/2019 | Dharmaji | |
| 10,432,335 B2 | 10/2019 | Bretherton | |
| 10,489,395 B2 | 11/2019 | Lakkur et al. | |
| 10,685,050 B2 | 6/2020 | Krishna et al. | |
| 10,698,906 B2 | 6/2020 | Hargreaves et al. | |
| 10,700,648 B2 | 6/2020 | Lesso | |
| 10,719,837 B2 | 7/2020 | Kolowich et al. | |
| 10,769,678 B2 | 9/2020 | Li | |
| 10,846,330 B2 | 11/2020 | Shilo | |
| 10,893,329 B1 | 1/2021 | Trim et al. | |
| 10,985,853 B2 | 4/2021 | Bretherton | |
| 10,986,064 B2 | 4/2021 | Siegel et al. | |
| 10,997,240 B1 | 5/2021 | Aschner et al. | |
| 11,431,660 B1 | 8/2022 | Leeds et al. | |
| 11,451,863 B1 | 9/2022 | Benjamin et al. | |
| 11,463,772 B1 | 10/2022 | Wanjari et al. | |
| 11,521,179 B1 | 12/2022 | Shetty | |
| 11,539,845 B1 | 12/2022 | Fowers et al. | |
| 11,580,982 B1 | 2/2023 | Karnawat et al. | |
| 11,586,344 B1 | 2/2023 | Balagurunathan et al. | |
| 11,605,387 B1 | 3/2023 | Muralitharan et al. | |
| 11,900,902 B2 | 2/2024 | Martinez Ramirez et al. | |
| 11,916,981 B1 | 2/2024 | Karnawat et al. | |
| 2002/0042920 A1 | 4/2002 | Thomas et al. | |
| 2002/0056087 A1 | 5/2002 | Berezowski et al. | |
| 2003/0117486 A1 | 6/2003 | Ferren et al. | |
| 2004/0057586 A1 | 3/2004 | Licht | |
| 2005/0201360 A1 | 9/2005 | Redstone | |
| 2005/0213726 A1 | 9/2005 | Rodman | |
| 2005/0213734 A1 | 9/2005 | Rodman | |
| 2005/0213735 A1 | 9/2005 | Rodman et al. | |
| 2006/0018457 A1 | 1/2006 | Unno et al. | |
| 2006/0018458 A1 | 1/2006 | McCree et al. | |
| 2006/0268667 A1 | 11/2006 | Jellison et al. | |
| 2007/0124756 A1 | 5/2007 | Covell et al. | |
| 2007/0271518 A1 | 11/2007 | Tischer et al. | |
| 2007/0271580 A1 | 11/2007 | Tischer et al. | |
| 2008/0086742 A1 | 4/2008 | Aldrey et al. | |
| 2009/0044217 A1 | 2/2009 | Lutterbach et al. | |
| 2009/0076917 A1 | 3/2009 | Jablokov et al. | |
| 2009/0100098 A1 | 4/2009 | Feher et al. | |
| 2009/0254934 A1 | 10/2009 | Grammens | |
| 2009/0298417 A1 | 12/2009 | Phillips | |
| 2010/0088187 A1 | 4/2010 | Courtney et al. | |
| 2010/0280641 A1 | 11/2010 | Harkness et al. | |
| 2011/0063406 A1 | 3/2011 | Albert et al. | |
| 2011/0067044 A1 | 3/2011 | Albo | |
| 2011/0267419 A1 | 11/2011 | Quinn et al. | |
| 2012/0040604 A1 | 2/2012 | Amidon et al. | |
| 2012/0191774 A1 | 7/2012 | Bhaskaran et al. | |
| 2012/0304206 A1 | 11/2012 | Roberts et al. | |
| 2012/0311444 A1 | 12/2012 | Chaudhri | |
| 2012/0311618 A1 | 12/2012 | Blaxland | |
| 2012/0331168 A1 | 12/2012 | Chen | |
| 2013/0074109 A1 | 3/2013 | Skelton et al. | |
| 2013/0247081 A1 | 9/2013 | Vinson et al. | |
| 2013/0253934 A1 | 9/2013 | Parekh et al. | |
| 2014/0019225 A1 | 1/2014 | Guminy et al. | |
| 2014/0040494 A1 | 2/2014 | Deinhard et al. | |
| 2014/0068432 A1 | 3/2014 | Kucharz et al. | |
| 2014/0073236 A1 | 3/2014 | Iyer | |
| 2014/0108531 A1 | 4/2014 | Klau | |
| 2014/0123191 A1 | 5/2014 | Hahn et al. | |
| 2014/0228010 A1 | 8/2014 | Barbulescu et al. | |
| 2014/0325557 A1 | 10/2014 | Evans et al. | |
| 2014/0372179 A1 | 12/2014 | Ju et al. | |
| 2015/0095014 A1* | 4/2015 | Marimuthu | G06F 40/284 704/9 |
| 2015/0163184 A1 | 6/2015 | Kanter et al. | |
| 2015/0242068 A1 | 8/2015 | Losey et al. | |
| 2015/0248798 A1 | 9/2015 | Howe et al. | |
| 2015/0289021 A1 | 10/2015 | Miles | |
| 2015/0319472 A1 | 11/2015 | Kotecha et al. | |
| 2015/0326922 A1 | 11/2015 | Givon et al. | |
| 2016/0027196 A1 | 1/2016 | Schiffer et al. | |
| 2016/0093289 A1 | 3/2016 | Pollet | |
| 2016/0188728 A1 | 6/2016 | Gill et al. | |
| 2016/0217488 A1 | 7/2016 | Ward et al. | |
| 2016/0266781 A1 | 9/2016 | Dandu et al. | |
| 2016/0291926 A1 | 10/2016 | Hundemer | |
| 2016/0293036 A1 | 10/2016 | Niemi et al. | |
| 2016/0330529 A1 | 11/2016 | Byers | |
| 2017/0127136 A1 | 5/2017 | Roberts et al. | |
| 2017/0164357 A1 | 6/2017 | Fan et al. | |
| 2017/0193531 A1* | 7/2017 | Fatourechi | G06Q 30/0201 |
| 2017/0213248 A1 | 7/2017 | Jing et al. | |
| 2017/0289617 A1 | 10/2017 | Song et al. | |
| 2017/0329466 A1 | 11/2017 | Krenkler et al. | |
| 2017/0366854 A1 | 12/2017 | Puntambekar et al. | |
| 2018/0025078 A1 | 1/2018 | Quennesson | |
| 2018/0035142 A1 | 2/2018 | Rao et al. | |
| 2018/0184213 A1 | 6/2018 | Lesimple et al. | |
| 2018/0205797 A1 | 7/2018 | Faulkner | |
| 2018/0227632 A1 | 8/2018 | Rubin et al. | |
| 2018/0255114 A1 | 9/2018 | Dharmaji | |
| 2018/0293221 A1 | 10/2018 | Finkelstein et al. | |
| 2018/0322411 A1 | 11/2018 | Wang et al. | |
| 2018/0367229 A1 | 12/2018 | Gibson et al. | |
| 2019/0065610 A1 | 2/2019 | Singh | |
| 2019/0132636 A1 | 5/2019 | Gupta et al. | |
| 2019/0156196 A1 | 5/2019 | Zoldi et al. | |
| 2019/0171762 A1 | 6/2019 | Luke et al. | |
| 2019/0273570 A1 | 9/2019 | Bretherton | |
| 2019/0327103 A1 | 10/2019 | Niekrasz | |
| 2019/0364359 A1 | 11/2019 | Ferguson et al. | |
| 2019/0385600 A1 | 12/2019 | Kim | |
| 2020/0021888 A1 | 1/2020 | Brandao et al. | |
| 2020/0106885 A1 | 4/2020 | Koster et al. | |
| 2020/0160458 A1 | 5/2020 | Bodin et al. | |
| 2020/0226418 A1 | 7/2020 | Dorai-Raj et al. | |
| 2020/0279553 A1 | 9/2020 | McDuff et al. | |
| 2020/0364727 A1* | 11/2020 | Scott-Green | G06Q 10/0635 |
| 2021/0090215 A1 | 3/2021 | Zhou et al. | |
| 2021/0104245 A1 | 4/2021 | Alas et al. | |
| 2021/0105149 A1 | 4/2021 | Roedel et al. | |
| 2021/0125054 A1 | 4/2021 | Banik et al. | |
| 2021/0160588 A1 | 5/2021 | Joseph et al. | |
| 2021/0210102 A1 | 7/2021 | Huh et al. | |
| 2021/0217413 A1 | 7/2021 | Tushinskiy et al. | |
| 2021/0224319 A1 | 7/2021 | Ingel et al. | |
| 2021/0232577 A1 | 7/2021 | Ogawa et al. | |
| 2021/0256086 A1 | 8/2021 | Askarian et al. | |
| 2021/0281925 A1 | 9/2021 | Shaikh et al. | |
| 2021/0366462 A1 | 11/2021 | Yang et al. | |
| 2021/0374391 A1 | 12/2021 | Jorasch et al. | |
| 2021/0407520 A1 | 12/2021 | Neckermann et al. | |
| 2022/0038783 A1 | 2/2022 | Wee | |
| 2022/0038790 A1 | 2/2022 | Duan et al. | |
| 2022/0159377 A1 | 5/2022 | Wilberding et al. | |
| 2022/0223286 A1 | 7/2022 | Lach et al. | |
| 2022/0230632 A1 | 7/2022 | Maitra et al. | |
| 2022/0254348 A1 | 8/2022 | Tay et al. | |
| 2022/0286748 A1 | 9/2022 | Dyer et al. | |
| 2022/0369034 A1 | 11/2022 | Kumar et al. | |
| 2022/0415327 A1 | 12/2022 | Fowers et al. | |
| 2022/0417297 A1 | 12/2022 | Daga et al. | |
| 2023/0036192 A1 | 2/2023 | Alakoye | |

(56) References Cited

U.S. PATENT DOCUMENTS

| | | |
|---|---|---|
| 2023/0085683 A1 | 3/2023 | Turner |
| 2023/0217195 A1 | 7/2023 | Poltorak |
| 2024/0031489 A1 | 1/2024 | Lundin et al. |

FOREIGN PATENT DOCUMENTS

| | | | |
|---|---|---|---|
| CN | 104813305 A | | 7/2015 |
| DE | 112020002288 T5 | | 2/2022 |
| KR | 20170079496 A | | 7/2017 |
| WO | 2019089028 A1 | | 5/2019 |

OTHER PUBLICATIONS

B. Subin, "Spotify for Android Tests New Floating Mini Player UI / Beebom," URL: https://beebom.com/spotify-tests-new-mini-player-android/, retrieved on Aug. 26, 2023, 3 pages.

Matt Ellis, "Desktop vs. mobile app design: how to optimize your user experience—99 designs," URL: https://99designs.com/blog/web-digital/desktop-vs-mobile-app-design/, retrieved Aug. 26, 2023, 12 pages.

Salesforce, "Introducing a profile page as sleek as a Tableau Public viz," https://www.tableau.com/, Tableau Software, LLC, a Salesforce Company, Jul. 21, 2021. Accessed Aug. 31, 2023. URL: https://www.tableau.com/blog/introducing-profile-page-sleek-tableau-public-viz, 7 pages.

Hoegen, Rens, et al. "An End-to-End Conversational Style Matching Agent." Proceedings of the 19th ACM International Conference on Intelligent Virtual Agents. 2019, pp. 1-8. (Year: 2019).

GitHub, "Spotify iOS SDK," GitHub.com, GitHub Inc. and GitHub B.V., Feb. 17, 2021, available at URL: https://github.com/spotify/ios-sdk#how-do-app-remote-calls-work, 10 pages.

Stack Overflow, "Audio mixing of Spotify tracks in IOS app," stackoverflow.com, Stack Overflow Network, Jul. 2012, available at URL: https://stackoverflow.com/questions/11396348/audio-mixing-of-spotify-tracks-in-ios-app, 2 pages.

Tengeh, R. K., & Udoakpan, N. (2021). Over-the-Top Television Services and Changes in Consumer Viewing Patterns in South Africa. Management Dynamics in the Knowledge Economy. 9(2), 257-277. DOI 10.2478/mdke-2021-0018 ISSN: 2392-8042 (online) www.managementdynamics.ro; URL: https://content.sciendo.com/view/journals/mdke/mdke-overview.xml.

* cited by examiner

| Creator and Media Program | Relevance to Listener | Creator Score |
|---|---|---|
| 610-1 — B. Falvey, "Cheating on Your Taxes: a Primer" | 0.98 — 642-1 | 0.62 — 640-1 |
| 610-2 — D. Duffee, "Distrust Government and Media" | 0.93 — 642-2 | 0.72 — 640-2 |
| 610-3 — C. Cauley, "Build Your Own Furniture" | 0.84 — 642-3 | 0.99 — 640-3 |
| 610-4 — J. Moore, "Probate for Rookies" | 0.82 — 642-4 | 0.93 — 640-4 |
| 610-5 — S. Knights, "Fixing Hooks and Slices" | 0.79 — 642-5 | 0.98 — 640-5 |

| Creator and Media Program | Modified Relevance |
|---|---|
| 640-3 — C. Cauley, "Build Your Own Furniture" | 0.83 — 644-3 |
| 640-5 — S. Knights, "Fixing Hooks and Slices" | 0.77 — 644-5 |
| 640-4 — J. Moore, "Probate for Rookies" | 0.76 — 644-4 |
| 640-2 — D. Duffee, "Distrust Government and Media" | 0.67 — 644-2 |
| 640-1 — B. Falvey, "Cheating on Your Taxes: a Primer" | 0.61 — 644-1 |

RELEVANCE RANKINGS OF MEDIA PROGRAMS MODIFIED
BASED ON CREATOR SCORE

FIG. 6A

SCORING MEDIA PROGRAM PARTICIPANTS FOR PREDICTING POLICY COMPLIANCE

BACKGROUND

Many systems or methods for presenting media content to listeners or viewers via terrestrial radio or televisions stations, satellite networks, or computer-based networks must ensure that media programs aired thereby comply with desired standards of quality and in compliance with relevant policies such as laws, regulations or other requirements. In particular, media content generated and transmitted to listeners typically must comply with one or more content-based restrictions. For this reason, many systems or entities for producing media programs or providing such media programs to listeners or viewers have made substantial investments in physical infrastructure and human talent, such as sound engineers, maintenance engineers, production directors, or station managers, who may be assigned a variety of tasks to ensure that media programs transmitted thereby comply with all relevant policies.

In some instances, personnel are trained or instructed to monitor media content to determine whether a creator or another participant in a media program has violated one or more of such policies, or to take any number of actions in response to any detected violations. Training and employing such personnel is typically expensive, however, as such personnel must commonly remain standing by during the generation and transmission of "live" media content to listeners or viewers, even where the creators are unlikely to violate any policies, or have not demonstrated any risk of violating any of such policies.

BRIEF DESCRIPTION OF THE DRAWINGS

FIGS. 6A and 6B are views of aspects of one system for scoring participants in accordance with embodiments of the present disclosure.

DETAILED DESCRIPTION

Figure 1A:
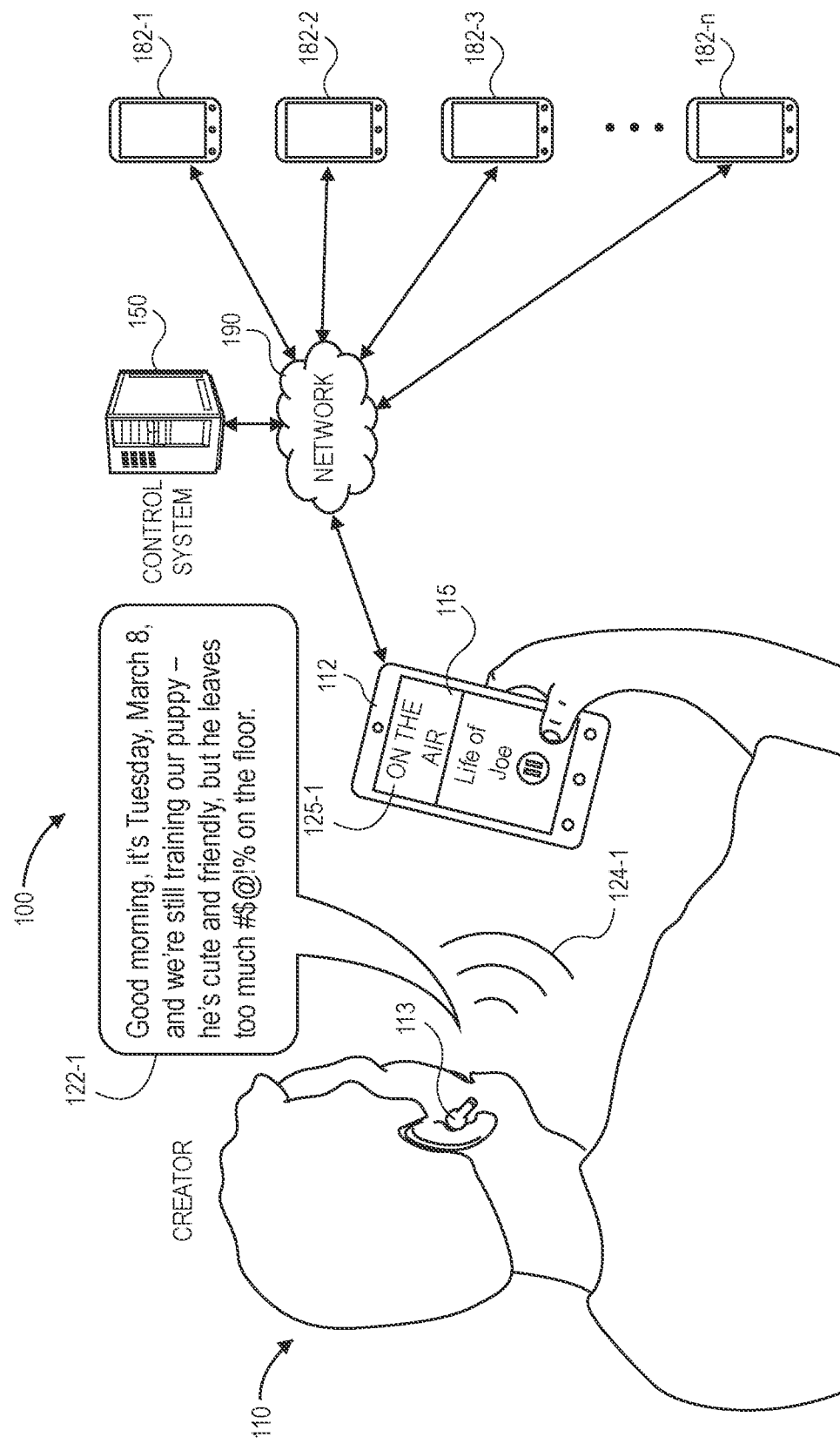
FIGS. 1A through 1F are views of aspects of one system for scoring participants in accordance with embodiments of the present disclosure.

As is set forth in greater detail below, the present disclosure is directed to systems and methods for scoring participants, including but not limited to creators or any guests or other participants, to predict their compliance with one or more policies (or rules, regulations, laws or other requirements) associated with the airing of media content. More specifically, in some implementations, the systems and methods of the present disclosure are directed to identifying information or data associated with media content of a creator or any other participant, including but not limited to data representing the media content itself, e.g., audio data or transcripts thereof, as well as any images associated with the creator, other participants or the media content, sets of words or text such as titles or summaries of the media content, reports received from listeners to the media content, postings or expressions of the creators or participants, as well as blogs, news stories or other records regarding the media content, or any other information or data.

Data associated with a participant, or media content of the participant, may be processed to determine whether the creator committed one or more violations of policies such as restrictions on media content, restrictions on behavior, or any other policies. Where any violations of policies are identified based on the data, values representative of the violations or extents or harms associated with the violations may be determined, and a score representative of a level or risk that the participant will comply with each of the policies, e.g., a creator score, a guest score, a participant score, a trust score, a safety score, a notoriety score, or any other type or form of score, may be calculated from such values.

Subsequently, a score calculated for a participant may be utilized in any manner with respect to the participant, or media content generated by the participant, e.g., a creator of a media program, or a guest or another participant in the media program, with an ultimate goal of protecting listeners or other participants from exposure to harmful content, or to content violating the one or more policies. For example, where a score indicates that a creator poses a low or insignificant risk of violating any policies, the creator may be permitted to generate media content in an unlimited manner, and such media content may be transmitted to devices of listeners without restrictions. Alternatively, where a score indicates that a creator may be likely to violate one or more policies, media content of the creator may be limited to certain times or days, or to certain listeners and not others, or the creator may be paired with certain advertisers and not others. Similar restrictions or limitations may be placed on a guest or another participant in a media program, where necessary, based on the score.

A score representative of a risk that a participant may violate one or more policies may be updated, e.g., increased or decreased, on a regular or irregular basis based on other media content subsequently created by the participant. In some instances, a score may serve as a basis for barring a creator, a guest, or another participant from generating media content, or suspending the creator, the guest or the other participant from generating media content, until a risk that the creator, the guest or the other participant will violate any policies is below an acceptable level.

Referring to FIGS. 1A through 1F, views of aspects of one system 100 for scoring participants in accordance with embodiments of the present disclosure are shown. As is shown in FIG. 1A, a mobile device 112 (e.g., a smartphone, a tablet computer, a laptop computer, or any other system or device) of a creator 110 (e.g., a user) is connected to a control system 150 (e.g., one or more servers or other computer systems), and a plurality of devices 182-1, 182-2, 182-3 . . . 182-$n$ or other systems of any number n of listeners are connected to a network 190 (or one or more networks), which may include the Internet in whole or in part. The devices 182-1, 182-2, 182-3 . . . 182-n may be of any type or form, including but not limited to mobile devices (e.g., smartphones, tablets or others), smart speakers, media players, computers (e.g., laptop or desktop computers), wrist watches, earphones or headphones, media streaming devices, or others. The creator 110 wears one or more ear buds 113 (or earphones, or headphones) or other communication systems or devices which may be in communication with the mobile device 112, and may exchange (e.g., transfer or receive data) relating to audio signals or any other data with the mobile device 112 directly, or with the mobile device 112 or any other computer devices or systems over the network 190.

The mobile device 112 includes a user interface 125-1 rendered on a display 115 of the mobile device 112. The user interface 125-1 includes information identifying a media program, viz., "Life of Joe," and includes one or more controls for initiating, pausing or terminating the capture and transmission of media content, e.g., audio data, by the mobile device 112 or the ear buds 113, or the transmission of the media content by the mobile device 112 to the control system 150 over the network 190. In some implementations, the display 115 may be a capacitive touchscreen, a resistive touchscreen, or any other system for receiving interactions by the creator 110.

Alternatively, or additionally, the creator 110 may interact with the user interface 125-1 or the mobile device 112 in any other manner, such as by way of any input/output ("I/O") devices, including but not limited to a mouse, a stylus, a touchscreen, a keyboard, a trackball, or a trackpad, as well as any voice-controlled devices or software (e.g., a personal assistant), which may capture and interpret voice commands using one or more microphones or acoustic sensors provided on the mobile device 112 or any other systems (not shown). In accordance with implementations of the present disclosure, the user interface 125-1, or other user interfaces, may include any number of buttons, text boxes, checkboxes, drop-down menus, list boxes, toggles, pickers, search fields, tags, sliders, icons, carousels, or any other interactive or selectable elements or features, for receiving information or data of any type or form. Moreover, in some implementations, the user interface 125-1 may include one or more features enabling the creator 110 to select one or more media entities (e.g., songs, podcasts, or other media entities such as news programs, sports programs, weather reports or others), which may be live or previously recorded, to air in accordance with the media program.

Additionally, the control system 150 may be programmed or configured to execute any number of operations associated with the presentation of media content to listeners associated with the devices 182-1, 182-2, 182-3 . . . 182-n. For example, in some implementations, the control system 150, or one or more other computer devices or systems, may initiate or establish one-way communications channels between the control system 150 or any other computer devices or systems and the devices 182-1, 182-2, 182-3 . . . 182-n. In some implementations, the control system 150, or one or more other computer devices or systems, may initiate or establish two-way communications channels between the control system 150 or any other computer devices or systems and the mobile device 112 of the creator 110, or devices or systems of any other participants (not shown in FIG. 1A) in one or more episodes of the media program. Alternatively, or additionally, the control system 150 or any other computer devices or systems may establish one-way or two-way communications channels with sources of media entities or other content (e.g., music, advertisements, news, or others).

As is also shown in FIG. 1A, the creator 110 provides an utterance 122-1 of one or more words that are intended to be heard by listeners to an episode of a media program using the devices 182-1, 182-2, 182-3 . . . 182-n. In particular, the utterance 122-1 includes the words "Good morning, it's Tuesday, March 8, and we're still training our puppy—he's cute and friendly, but he leaves too much #$@!% on the floor." The mobile device 112 and/or the ear buds 113 capture audio data (or acoustic data) 124-1 representing the utterance 122-1 of the creator 110, and transmit the data to the control system 150 over the network 190. The control system 150 may then cause data, e.g., some or all of the data 124-1 captured by the mobile device 112 and/or the ear buds 113, to be transmitted to one or more computer systems or devices of listeners over the network 190, including but not limited to the devices 182-1, 182-2, 182-3 . . . 182-n.

Figure 1B:
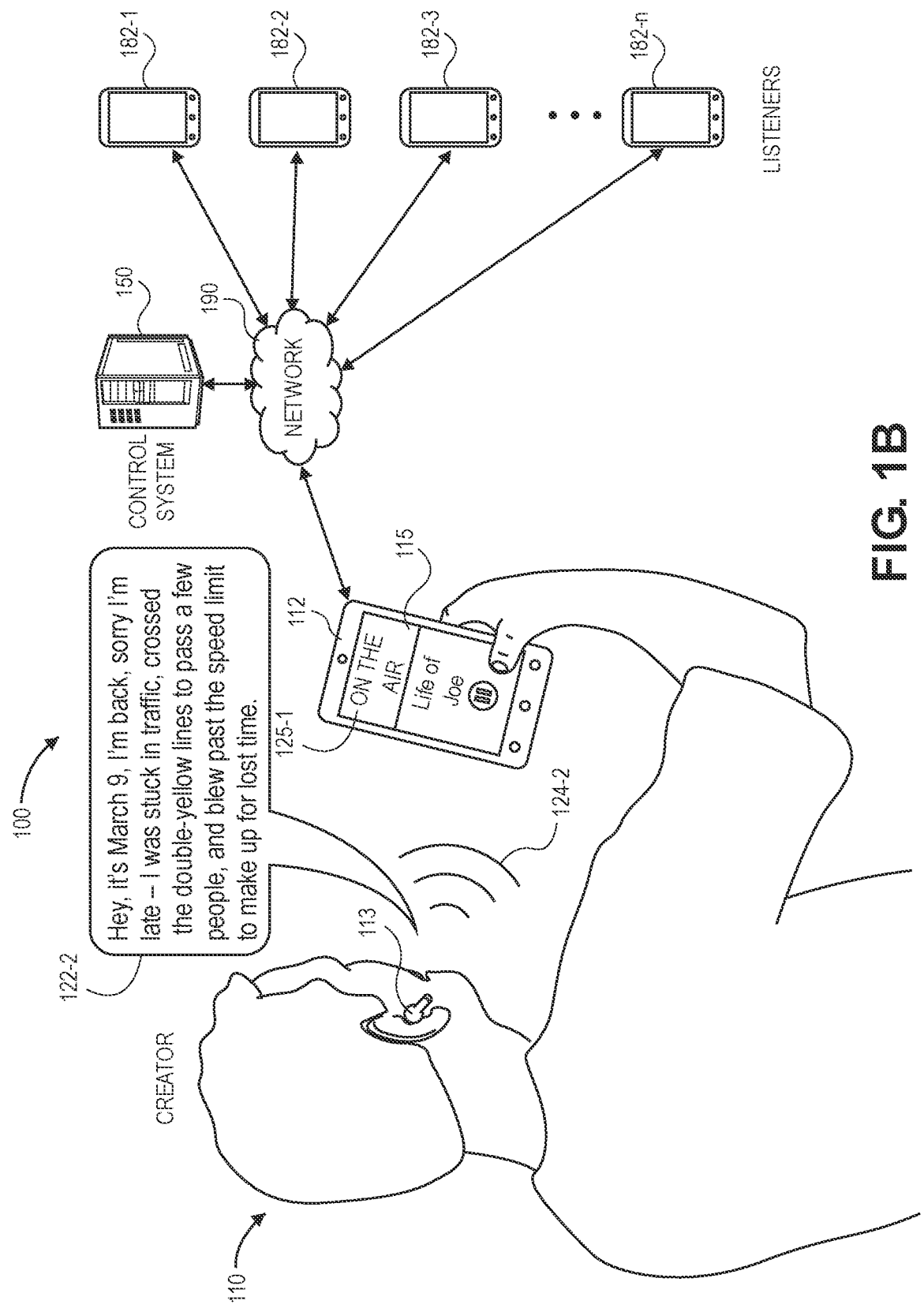

As is shown in FIG. 1B, the creator 110 provides an utterance 122-2 of one or more words that are intended to be heard by listeners to another episode of a media program, e.g., on another day or at a later time, using the devices 182-1, 182-2, 182-3 . . . 182-n. The utterance 122-2 includes the words "Hey, it's March 9, I'm back, sorry I'm late—I was stuck in traffic, crossed the double-yellow lines to pass a few people, and blew past the speed limit to make up for lost time." The mobile device 112 and/or the ear buds 113 capture audio data 124-2 representing the utterance 122-2 of the creator 110, and transmit the data 124-2 to the control system 150 over the network 190. The control system 150 may then cause data, e.g., some or all of the data 124-2, to be transmitted to one or more computer systems or devices of listeners over one or more networks 190, including but not limited to the devices 182-1, 182-2, 182-3 . . . 182-n.

Figure 1C:
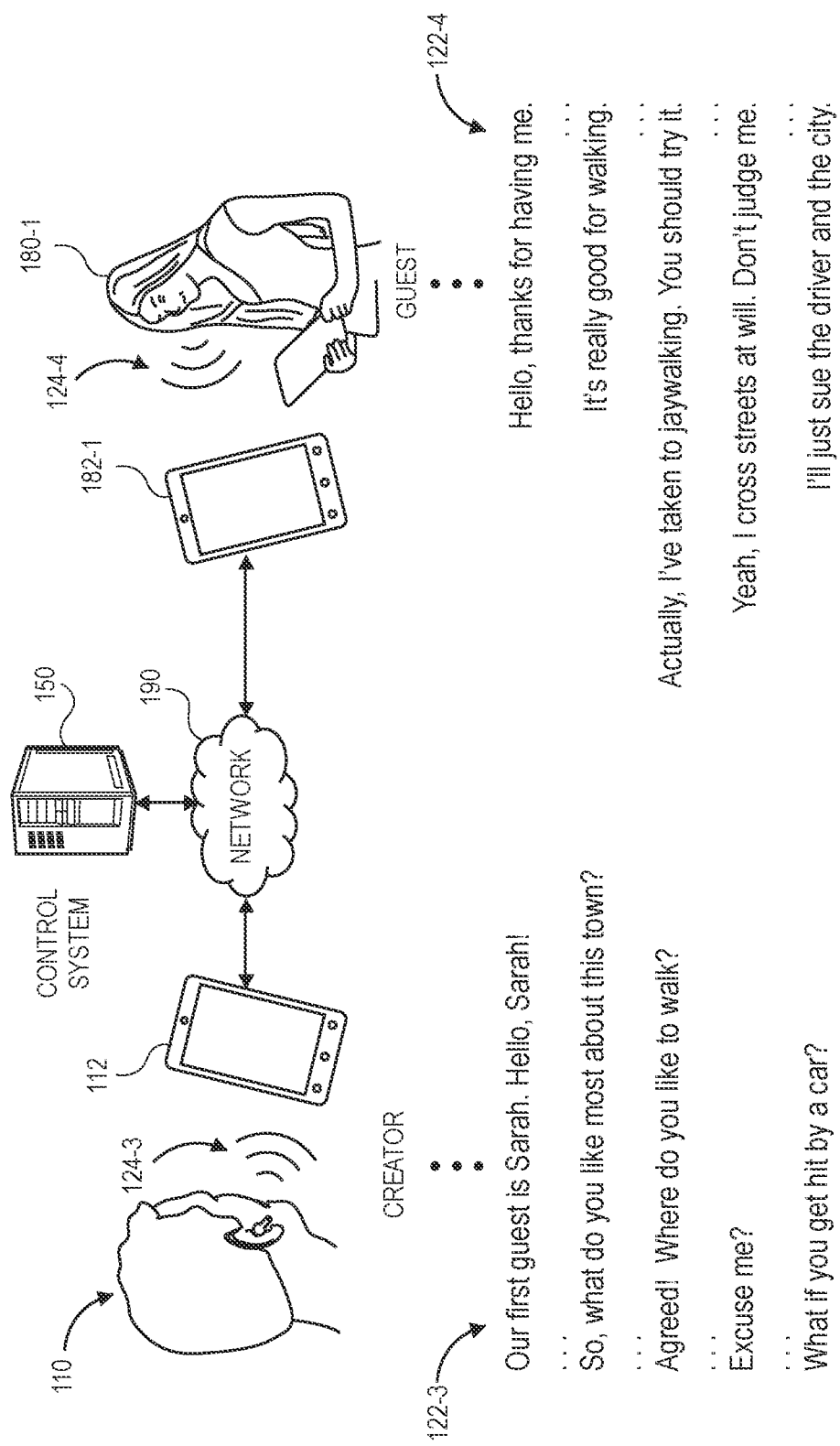

As is shown in FIG. 1C, the creator 110 engages in conversation with one of the listeners 180-1 (e.g., a guest or another participant) by way of one of the devices 182-1 during another episode of the media program. Each of the creator 110 and the listener 180-1 provides a series of utterances 122-3, 122-4, respectively, to the mobile device 112 or the ear buds 113 and the mobile device 182-1, which capture audio data 124-3, 124-4, respectively, and transmit the audio data 124-3, 124-4 to the control system 150 over the network 190.

For example, as is shown in FIG. 1C, the creator 110 states, "Our first guest is Sarah. Hello, Sarah!" and the listener 180-1 replies, "Hello, thanks for having me." The creator 110 then asks, "So, what do you like most about this town?" and the listener 180-1 responds with, "It's really good for walking." The creator 110 further asks, "Agreed! Where do you like to walk?" and the listener 180-1 replies, "Actually, I've taken to jaywalking. You should try it." The creator 110 also asks, "Excuse me?" and the listener 180-1 replies, "Yeah, I cross streets at will. Don't judge me." The creator 110 finally asks, "What if you get hit by a car?" and the listener 180-1 replies, "I'll just sue the driver and the city."

In accordance with implementations of the present disclosure, a score may be calculated for a creator, a guest, or another participant based on data regarding media content generated by or associated with the creator, the guest or the other participant, e.g., audio data such as spoken or sung words, or transcripts of the audio data. Alternatively, or additionally, data regarding the media content may include reports received from listeners, e.g., positive, negative, neutral or other opinions, as well as images, titles, summaries, posts or expressions of the creator, the guest, or the other participant, or any other information or data.

Figure 1D:
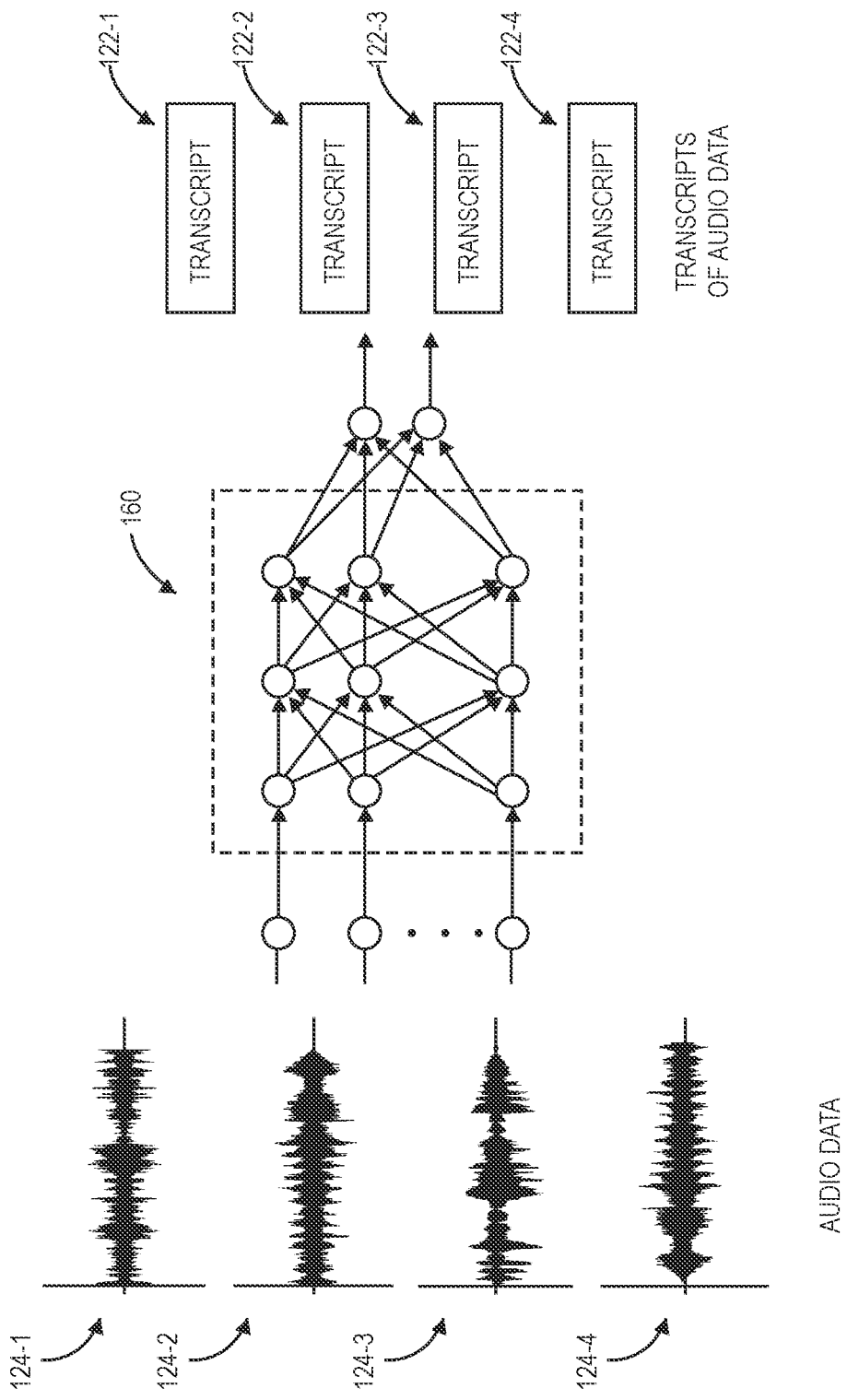

As is shown in FIG. 1D, the audio data 124-1, 124-2, 124-3 received from the mobile device 112 of the creator 110 and the audio data 124-4 received from the device 182-1 of the listener 180-1 are processed by a machine learning model 160, e.g., a speech recognition model, that is trained to identify words represented in the audio data 124-1, 124-2, 124-3, 124-4, and words represented in the utterances 122-1, 122-2, 122-3, 122-4 are identified as transcripts of the audio data 124-1, 124-2, 124-3, 124-4 accordingly. In some implementations, the audio data 124-1, 124-2, 124-3, 124-4 may be processed by one or more natural language understanding (or "NLU") processing modules, a speech recognition engine or module, or another processing module, to identify words represented in the audio data. For example, one or more computer devices or systems may transform the audio data 124-1, 124-2, 124-3, 124-4 for processing by a speech recognition engine or module, which may compare the data to one or more acoustic models, language models or other data models to recognize any words incorporated in the audio data. The machine learning model 160 may be executed by the control system 150, or by any other computer device or system in communication with the control system 150, including but not limited to the mobile device 112 of the creator 110.

Figure 1E:
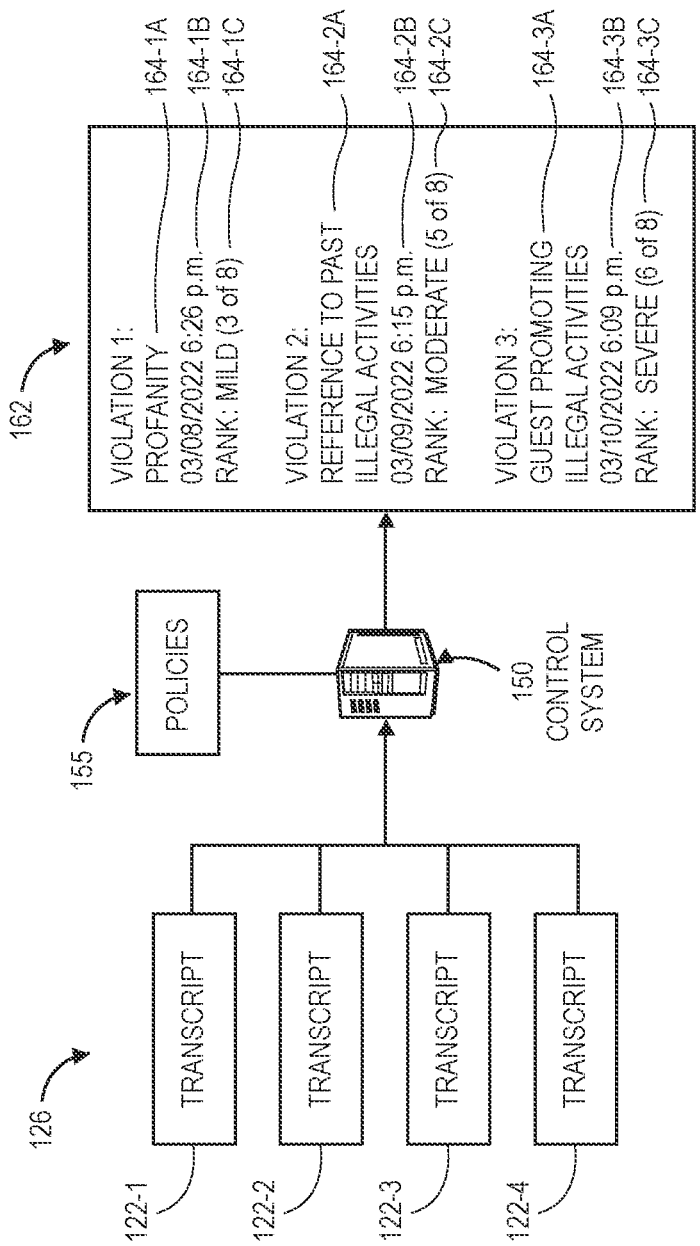

As is shown in FIG. 1E, a set of inputs 126 including the words represented in the utterances 122-1, 122-2, 122-3, 122-4 or any other information or data may be compared to one or more policies 155 maintained by the control system 150, or any other device or system, to determine whether the creator 110 violated any of the policies 155. For example, such policies 155 may include, but need not be limited to, restrictions on hate-based speech; harassment or defamation; racist, ethnocentric or otherwise objectively deplorable content; incitements to perform acts that would violate any standard, ordinance, regulation, statute or law; content of a sexual or mature nature; or any other restrictions on content of any type or form. Alternatively, the policies may relate to any other attribute of media content, and may be based on any matter of public or private concern.

In some implementations, the words represented in the utterances 122-1, 122-2, 122-3, 122-4 may be processed to determine a sentiment of the media content, or one or more evaluations, attitudes, appraisals, emotions, moods or judgments represented within the media content, e.g., using one or more machine learning algorithms, systems or techniques.

For example, a sentiment or opinion may be identified or classified with respect to transcripts as a whole, or with respect to one or more individual portions (e.g., passages, paragraphs or sentences) of the transcripts. When analyzing the transcripts or portions thereof in order to identify a sentiment or opinion expressed therein, the transcripts may be bifurcated or otherwise divided into sections containing objective, fact-based statements or components, and sections containing subjective, opinion-based statements or components, the latter of which are considered or emphasized in a sentiment analysis context. Subjective, opinion-based statements or components may further be subdivided into groups of express opinions (e.g., "I like Siberian Huskies") or opinions of a comparative nature (e.g., "I prefer the colors blue and white over the colors burgundy and gold").

Additionally, a sentiment or opinion of media content may be identified broadly in terms of polarity, i.e., whether the transcript or the media content is generally positive, negative or neutral, or in terms of grades or degrees. For example, words or media content may be classified as "happy" or "sad," "inspirational" or "depressing," "peaceful" or "disturbed," "angry" or "content," or with any other identifier or pair of identifiers, and to any extent or degree thereof, which may be expressed in one or more qualitative or quantitative terms. Moreover, sentiment analyses may be trained or restricted to a specific topic or category, or otherwise directed to obtaining a sentiment of a focused nature, such as a sentiment regarding the economy, sports or politics.

In order to identify and obtain a sentiment or an opinion from media content, a transcript or another set of words or any data or information included in the media content may be analyzed in any manner. For example, one or more machine learning algorithms or techniques may be provided to determine a sentiment from a transcript of media content, or the media content itself, e.g., by one or more nearest neighbor methods or analyses, artificial neural networks, factorization methods or techniques, K-means clustering analyses or techniques, similarity measures such as log likelihood similarities or cosine similarities, Bayesian classifiers, singular value decomposition methods, latent Dirichlet allocations or other topic models, linear or non-linear models, or latent semantic analyses, which may be used to review and assess the media content, and to identify any pertinent keywords maintained therein, which may be analyzed and associated with one or more sentiments or opinions thereof.

In some implementations, one or more of the policies 155 may have a binary construct, and may be framed or defined in absolute terms, e.g., as either violated (or invoked), or not violated (or not invoked), by any actions taken by a creator, a guest, or another participant in a media program, or media content transmitted in accordance with the media program. In some other implementations, one or more of the policies 155 may be interpreted in a qualitative manner, or as a matter of degree, to determine an extent of a violation by such actions or such content, or an extent to which one or more of the policies 155 is violated by such actions or such content.

As is further shown in FIG. 1E, the control system 150 has identified a set 162 of three violations based on the inputs 126, which may include but need not be limited to words represented in the utterances 122-1, 122-2, 122-3, 122-4. The set 162 indicates that a first violation 164-1A, e.g., the use of profanity, occurred at a time 164-1B during the episode of the media program shown in FIG. 1A and further indicates a value 164-1C representative of a grade or an extent of the first violation 164-1A, e.g., a rank of "mild," or a value of three on a scale of one to eight. The value 164-1C may be calculated based on a number of the words represented in the utterances 122-1, 122-2, 122-3, 122-4 that constitute the first violation 164-1A, a context of the first violation 164-1A, a time of day or day of week when the first violation 164-1A occurred, or any other factor.

Whether the words represented in the utterances 122-1, 122-2, 122-3, 122-4 or any other inputs 126 associated with the media program violates any of the policies 155 may be determined in any manner. For example, in some implementations, the utterances 122-1, 122-2, 122-3, 122-4 may be compared to a set of restricted or prohibited words, and a violation may be determined where one or more of the utterances 122-1, 122-2, 122-3, 122-4 includes one or more of the restricted or prohibited words. Alternatively, whether the represented words in the utterances 122-1, 122-2, 122-3, 122-4 or any other data associated with the media program violates any of the policies 155 may be determined in any other manner, such as by processing the audio data 124-1, 124-2, 124-3, 124-4 or the words represented in the utterances 122-1, 122-2, 122-3, 122-4 to determine any sentiments of the creator 110 or the listener 180-1, or to determine any other attributes of the voice samples or utterances. For example, the control system 150 may operate or execute any types of machine learning algorithms, systems or techniques to evaluate the audio data 124-1, 124-2, 124-3, 124-4 or the words represented in the utterances 122-1, 122-2, 122-3, 122-4 for violations of any of the policies 155, or to determine sentiments or any other attributes of the audio data 124-1, 124-2, 124-3, 124-4 or the words represented in the utterances 122-1, 122-2, 122-3, 122-4.

Moreover, whether any of the policies 155 is violated may be determined with respect to any metrics and subject to any level of confidence, which may be calculated or determined in any manner. Furthermore, whether any of the policies 155 is violated may be determined within a context of the media program. For example, where the media program has a designation or rating that indicates or suggests that the media program will include profanity or objectionable language, e.g., a media program intended for adults, or has a basis or a requirement to include profanity or objectionable language, the use of such language in the context of that media program may not be deemed a violation of a policy barring such language, or a value representing a grade or an extent of the violation may be lower than for other media programs that do not typically include such language, or are not authorized to do so.

As is also shown in FIG. 1E, the set 162 indicates that a second violation 164-2A, e.g., a reference to past illegal activities (such as speeding or erratic driving), occurred at a time 164-2B during the episode of the media program shown in FIG. 1B and further indicates a value 164-2C representative of a grade or an extent of the second violation 164-2A, e.g., a rank of "moderate," or a value of five on a scale of one to eight. As is further shown in FIG. 1E, the set 162 indicates that a third violation 164-3A, e.g., a guest promoting illegal activities (such as jaywalking or filing frivolous lawsuits), occurred at a time 164-3B during the episode of the media program shown in FIG. 1C and further indicates a value 164-3C representative of a grade or an extent of the third violation 164-3A, e.g., a rank of "severe," or a value of six on a scale of one to eight.

A score representative of a risk that the creator will violate one or more of the policies 155, or any other policies, may be calculated based on the values 164-1C, 164-2C, 164-3C, or on any other basis, and utilized for any purpose. In some implementations, a score may be calculated by an algorithm, an equation or a formula, e.g., a weighted sum formula, based on the values 164-1C, 164-2C, 164-3C. In some other implementations, however, one or more of the values 164-1C, 164-2C, 164-3C or any other data may be provided as inputs to a machine learning model trained to determine levels of risk that a creator will violate one or more of the policies 155, and a score may be calculated based on an output received from the machine learning model in response to the inputs. Alternatively, a score may be calculated in any other manner.

Figure 1F:
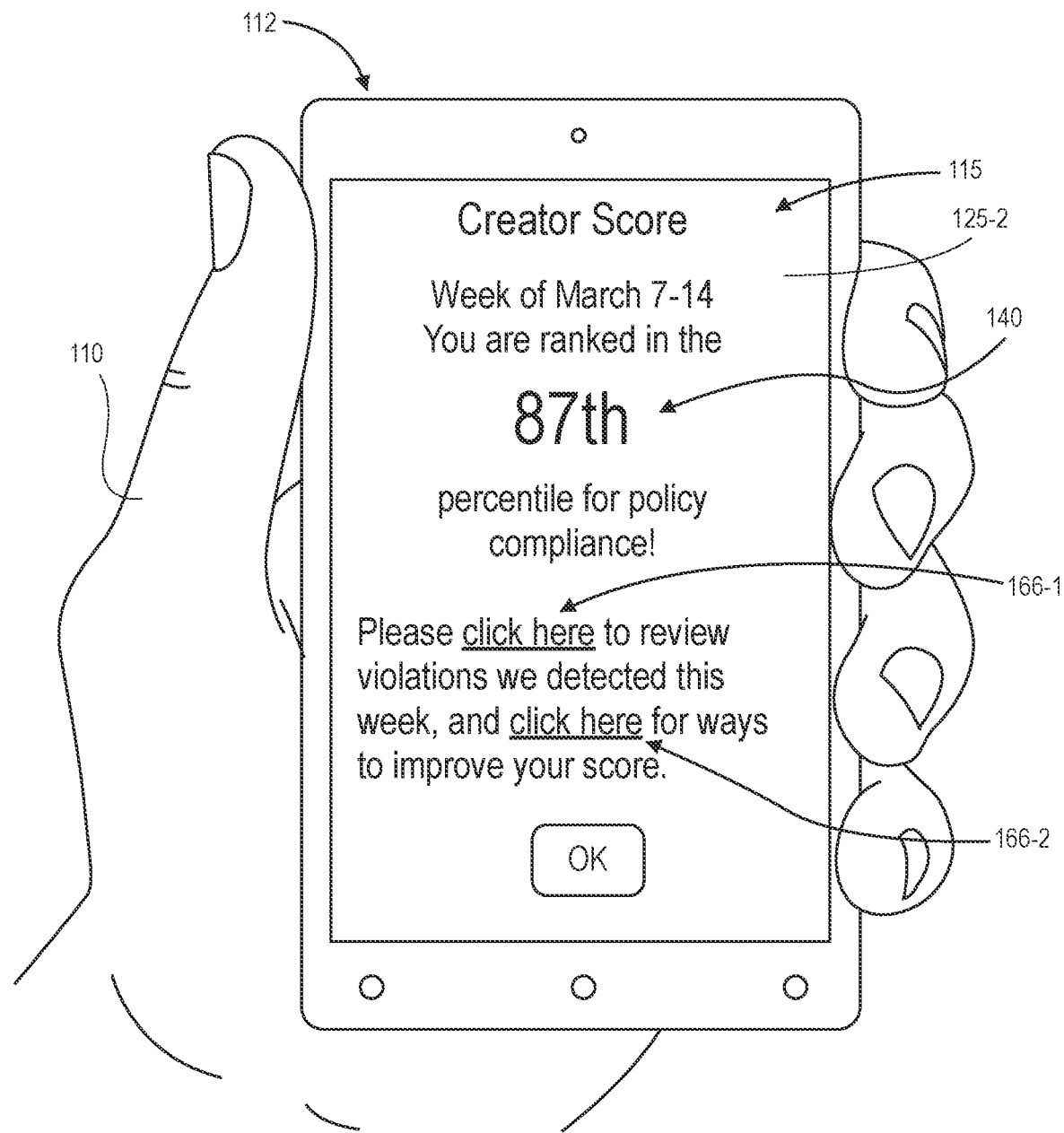

For example, as is shown in FIG. 1F, information regarding a score 140 calculated for the creator 110 is transmitted to the mobile device 112 and displayed in a user interface 125-2 rendered on the display 115. The user interface 125-2 indicates that the score 140 was calculated for the creator 110 over a period of time during which the episodes of the media program represented in FIGS. 1A through 1C were aired, and represents a percentile or share of creators for which the creator 110 has been ranked in terms of compliance with the one or more policies 155. The user interface 125-2 further includes an interactive link 166-1 to information regarding violations of the policies 155 identified during this period of time, e.g., the violations 164-1A, 164-2A, 164-3A, as well as an interactive link 166-2 to potential actions that the creator 110 may undertake in order to improve his or her score 140. In some implementations, the score 140, or information regarding the score 140, may be transmitted to one or more devices of listeners, or prospective listeners, to a media program associated with the creator 110. For example, in some implementations, a qualitative or a quantitative indicator of the score 140 may be displayed in association with one or more titles of media programs by the creator 110 or episodes thereof, e.g., as a number, a percentile, a symbol, one or more descriptive characters (e.g., "C" for clean or "E" for explicit), or any other indicators.

Alternatively, or additionally, the score 140 may be calculated based on any other data regarding the creator 110 or the media program, which may be identified in any manner. For example, in some implementations, the score 140 may be calculated based on information or data representing reports received from any of the devices 182-1, 182-2, 182-3 . . . 182-n of listeners, e.g., positive, negative or neutral opinions of such listeners, or whether any of the listeners believe that the creator 110 or another participant may have committed violations of any number of policies. In some implementations, the score 140 may be calculated based on any information or data regarding images associated with the creator 110 or the media content, such as "cover art," "album art," or other images that are commonly associated with the creator, e.g., images of the creator 110 or any other participants, or any other images. Such images may be processed to determine or recognize the content thereof, e.g., according to one or more machine learning models, and to determine whether the content complies with one or more of the policies 155. For example, in some implementations, one or more of the policies 155 may prohibit images having nudity, gore, harmful or hateful symbols, or other aspects, and to the extent that such images depict or are similar to any prohibited content, the score 140 may be calculated accordingly.

In some implementations, the score 140 may be calculated based on any information or data regarding one or more words included in a title or a summary of a media program including the media content, or an episode of the media program. In some implementations, the score 140 may be calculated based on any information or data regarding social media posts or other expressions by the creator 110 or another participant made prior to airing the media content, while airing the media content, or after the media content has been aired. Such posts or expressions may include any publicly available information or data regarding the creator 110 or any other participants in the generation of the media content, including but not limited to blogs, news stories or other records.

Where the score 140 indicates that the risk that the creator 110 will violate any of the policies 155 is sufficiently low, the creator 110 may be permitted to present media content to listeners again, e.g., without restrictions. Conversely, where the score 140 is unacceptably high, the creator 110 may be barred or suspended from presenting media content to listeners again, on a permanent or temporary basis, such as until one or more predetermined or remedial actions is undertaken. Alternatively, in some implementations, any other actions (or restrictions or limitations) relating to the presentation of media content by the creator 110 may be identified based on the score 140 and imposed upon the creator 110. For example, in some implementations, one or more human-operated or automated systems may be programmed or configured to monitor media content of the creator more closely than media content of other creators or their guests. In some other implementations, the creator may be limited to media content having subject matter of specific types or forms, e.g., topics, skits, guests, media entities, or others, and restricted from generating media content of other types or forms.

In still other implementations, media content generated by the creator may be limited to specific times or periods of day, e.g., time slots, which may be selected based on the score 140. For example, where the score 140 indicates that the creator poses a substantial risk of violating one or more policies, the creator 110 may be limited to airing media content during evening or late-night hours, or on weekends.

In some implementations, media content of the creator 110 may be limited to specific listeners or groups of listeners (e.g., listeners of certain ages) based on the score 140, or may be specifically marketed to listeners or groups of listeners in a manner determined by the score 140. For example, where the score 140 indicates that a risk that the creator 110 will commit a violation is comparatively high, but is low enough to permit the creator 110 to continue presenting media content to listeners, media programs of the creator 110 may be downgraded in rankings or lists of recommendations of media programs to such listeners, in an effort to steer listeners away from media programs of the creator 110. Conversely, where the score 140 indicates that a risk that the creator 110 will commit a violation is low, media programs of the creator 110 may be preferentially upgraded in rankings or lists of recommendations, in an effort to steer listeners toward media programs of the creator 110.

Moreover, in some implementations, the creator 110 may be paired with advertisers based on the score 140, such as by identifying an entity, a product or a service having a level of tolerance for risk that is consistent with a level of risk that the creator 110 may commit one or more violations of policies, as determined based on the score 140. For example, where an entity is particularly risk averse, the entity may be paired with the creator 110 if the score 140 indicates that the creator 110 has a low risk of committing violations of any policies. One or more advertisements for the entity, or for products or services of the entity, may be aired during media programs by the creator 110. Conversely, where an entity is cutting edge, trendy, or otherwise comfortable with at least a small level of risk, the entity may be paired with the creator 110 even if the score 140 indicates that the creator 110 may have some level of risk of committing violations of any policies. Furthermore, in some implementations, advertisements themselves may be selected for airing during media programs of the creator 110 based on the score 140. For example, where the same entity has multiple advertisements including content with varying degrees of content with respect to one or more of the policies 155, one of the advertisements may be selected for inclusion in an episode of a media program of the creator 110 where the content of the selected advertisement is consistent with a level of risk represented in the score 140.

The score 140 may be updated or revised (e.g., increased or decreased over time) as the creator 110 continues to generate and transmit media content. For example, where the score 140 is calculated according to a weighted sum formula or another mathematical relation, e.g., based on values representing violations identified in media content generated by the creator 110, the score 140 may be increased or decreased as values are calculated for media content subsequently generated by the creator 110. The score 140 may be updated on a regular basis, e.g., after regular periods of time, such as one day, one week or one month, or after a predetermined number of episodes or media programs, such as one, two, five or ten. Moreover, where the score 140 is a numerical value representative of a level of risk, the score 140 may be represented as a step function, a continuous function, or any other function. Where the score 140 is represented as a percentile or share, e.g., of all creators, the score 140 may be updated on a regular basis, or as levels of risk of the creator 110 or any other creators have changed.

In some implementations, the score 140 may be calculated by the control system 150, or by any other device or system associated with the presentation of media content of the creator 110 to one or more devices 182-1, 182-2, 182-3 . . . 182-$n$ of listeners. Alternatively, the score 140 may be calculated by another device or system, e.g., a third-party system, that is not associated with the presentation of media content to devices of listeners. The score 140 may be utilized by any device or system associated with the presentation of media content to listeners, for any purpose, and need not be limited for use by a device or system that calculated the score 140.

Although the score 140 is calculated based on media content generated by or associated with the creator 110, scores may be calculated for any type of participant in a media program, e.g., creators, guests or others, and may be applied to media content subsequently generated in association with such participants, in any capacity. For example, a score may be calculated for the listener 180-1, e.g., based on the audio data 122-4, the utterances 124-4, or any other data.

Moreover, where a score has been calculated based on a risk that a participant will violate one or more policies associated with a media program, a level of risk that an episode of the media program will include one or more of such violations may be increased or decreased accordingly where the participant is scheduled to participate in the media program. Likewise, where the participant is one of many individuals who requests to participate in the media program, the participant may be preferentially favored (or elevated in a ranking of the individuals) if the score indicates that the participant poses a low risk of a violation, and disfavored (or dropped in the ranking) if the score indicates that the participant poses a high risk of a violation. Alternatively, a level of risk of a violation that is represented in a score may be utilized in any other manner and for any other purpose.

As used herein, the term "media entity" may refer to media content of any type or form (e.g., audio and/or video) that may be recorded, stored, maintained or transmitted in one or more files, such as a movie, podcast, a song (or title), a television show, or any other audio and/or video programs. The term "media entity" may also refer to a descriptor of media content, e.g., an era, a genre, or a mood, or any other descriptor of one or more audio and/or video programs. The term "media entity" may further include a file including information, data or metadata regarding one or more sets of media content, or a physical or virtual representation of the one or more sets of media content, such as an album, a playlist, a soundtrack, or any other information, data, metadata, or representations. The term "media entity" may also include one or more persons or entities associated with such media content, e.g., an artist, a group, a label, a producer, a service, a station, or any other persons or entities.

Media content that may be included in a media program includes, but need not be limited to, one or more media entities retrieved from a music catalog, repository or streaming service, one or more advertisements of items, goods or services, or one or more news, sports or weather programs, which may be generated live or previously recorded. Media content that may be included in a media program also includes audio data representing words that are spoken or sung by a creator or one or more guests, such as musicians, celebrities, personalities, athletes, politicians, or artists, or any listeners to the media program. A control system, or any associated conference systems, broadcast systems or mixing systems, may establish or terminate connections with a creator, with any sources of media content, or with any number of listeners, to compile and efficiently transmit media content of a media program over digital channels (e.g., web-based or application-based), to any number of systems or devices of any form.

One or more of the embodiments disclosed herein may overcome limitations of existing systems and methods for presenting media programs or other content, e.g., radio programs, to listeners. Unbounded by traditional frequency bands or broadcast protocols, the systems and methods of the present disclosure may receive designations of media content from a creator of a media program, e.g., in a broadcast plan, and the media program may be transmitted over one or more networks to any number of listeners in any locations and by way of any devices. Creators of media programs may designate one or more types or files of media content to be broadcast to listeners via a user interface rendered on a display or by any type or form of computer device, in accordance with a broadcast plan or other schedule. A control system, or a mixing system, a conference system or a broadcast system, may retrieve the designated media content from any number of sources, or initiate or control the designated media content to any number of listeners, by opening one or more connections between computer devices or systems of the creator and computer devices or systems of the sources or listeners.

In some implementations of the present disclosure, one-way communication channels, or unidirectional channels, may be established between a broadcast system (or a control system) and any number of other computer devices or systems. For example, broadcast channels may be established between a broadcast system (or a control system) and sources of media or other content, or between a broadcast system (or a control system) and devices of any number of listeners, for providing media content. Two-way communication channels, or bidirectional channels, may also be established between a conference system (or a control system) and any number of other computer devices or systems. For example, a conference channel may be established between a computer device or system of a creator or another source of media and a conference system (or a control system). Furthermore, one-way or two-way communication channels may be established between a conference system and a mixing system, or between a mixing system and a broadcast system, as appropriate.

Communication channels may be established in any manner, in accordance with implementations of the present disclosure. Those of ordinary skill in the pertinent arts will recognize that computer networks, such as the Internet, may operate based on a series of protocols that are layered on top of one another. Such protocols may be collectively referred to as an Internet Protocol suite (or IP suite). One underlying layer of the IP suite is sometimes referred to in the abstract as a link layer, e.g., physical infrastructure, or wired or wireless connections between one or more networked computers or hosts. A second layer atop the link layer is a network layer, which is sometimes called an Internet Protocol layer, and is a means by which data is routed and delivered between two disparate physical locations.

A third layer in an IP suite is a transport layer, which may be analogized to a recipient's mailbox. The transport layer may divide a host's network interface into one or more channels, or ports, with each host having as many ports available for establishing simultaneous network connections. A socket is a combination of an IP address describing a host for which data is intended and a port number indicating a channel on the host to which data is directed. A socket is used by applications running on a host to listen for incoming data and send outgoing data. One standard transport layer protocol is the Transmission Control Protocol, or TCP, which is full-duplex, such that connected hosts can concurrently send and receive data. A fourth and uppermost layer in the IP suite is referred to as an application layer. Within the application layer, familiar protocols such as Hypertext Transfer Protocol (or "HTTP"), are found. HTTP is built on a request/response model in which a client sends a request to a server, which may be listening for such requests, and the server parses the request and issues an appropriate response, which may contain a network resource.

One application-layer protocol for communicating between servers and clients is called WebSocket, which provides TCP-like functionality at the application layer. Like TCP, WebSocket is full-duplex, such that once an underlying connection is established, a server may, of its own volition, push data to client devices with which the server is connected, and clients may continue to send messages to the server over the same channel. Additionally, a pure server-push technology is also built into HTML5, one version of Hypertext Markup Language. This technology, which is known as Server-Sent Events (or SSE), operates over standard HTTP, and is a novel use of an existing application-layer protocol. Server-Sent Events works by essentially sending partial responses to an initial HTTP request, such that a connection remains open, enabling further data to be sent at a later time. In view of its unidirectional nature, Server-Sent Events is useful in situations in which a server will be generating a steady stream of updates without requiring anything further from a client.

Communications channels of the present disclosure may be associated with any type of content and established computer devices and systems associated with any type of entity, and in accordance with a broadcast plan or sequence of media content, or at the control or discretion of one or more creators. One or more user interfaces rendered by or on a computer system or device may permit a creator to control the synchronization or mixing of media content by the broadcast system or the mixing system. Gestures or other interactions with the user interfaces may be translated into commands to be processed by the broadcast system or the mixing system, e.g., to play a specific media entity, to insert a specific advertisement, or to take any other relevant actions, such as to adjust a volume or another attribute or parameter of media content. Moreover, a broadcast system or the mixing system may provide any relevant information to a creator via such user interfaces, including information regarding attributes or parameters of media content that was previously played, that is being played, or that is scheduled to be played in accordance with a broadcast plan or during a media program. The broadcast system or the mixing system may further execute one or more instructions in response to rules, which may define or control media content that is to be played at select times during a media program, e.g., to automatically increase or decrease volumes or other attributes or parameters of a voice of a creator, or of other media content from other sources, on any basis. Any rules governing the playing of media content of a media program by the broadcast system or the mixing system may be overridden by a creator, e.g., by one or more gestures or other interactions with a user interface of an application in communication with the broadcast system or the mixing system that may be associated with the playing of the media content or the media program.

Figure 2A:
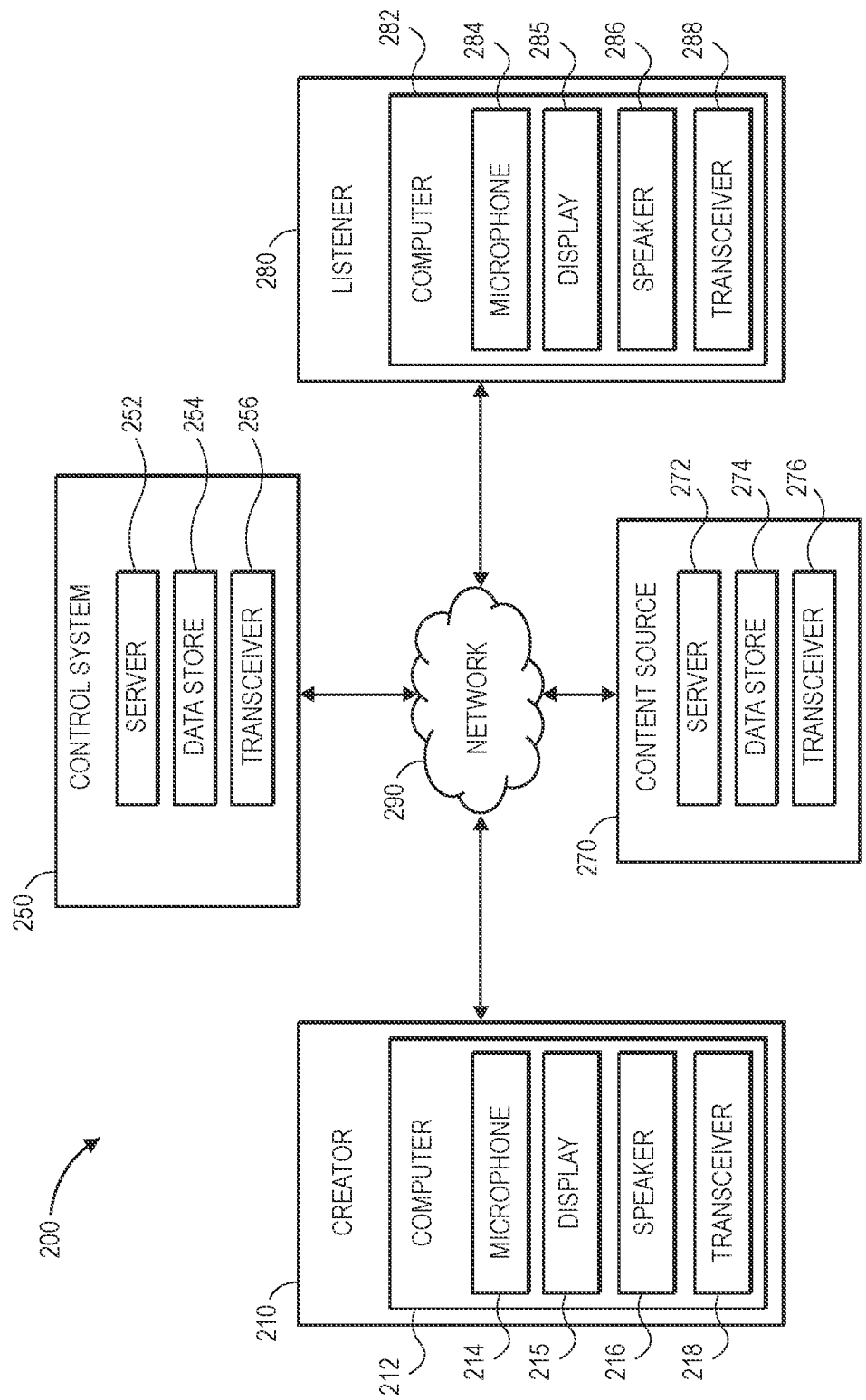
FIGS. 2A and 2B are block diagrams of components of one system for scoring participants in accordance with embodiments of the present disclosure.
Figure 2B:
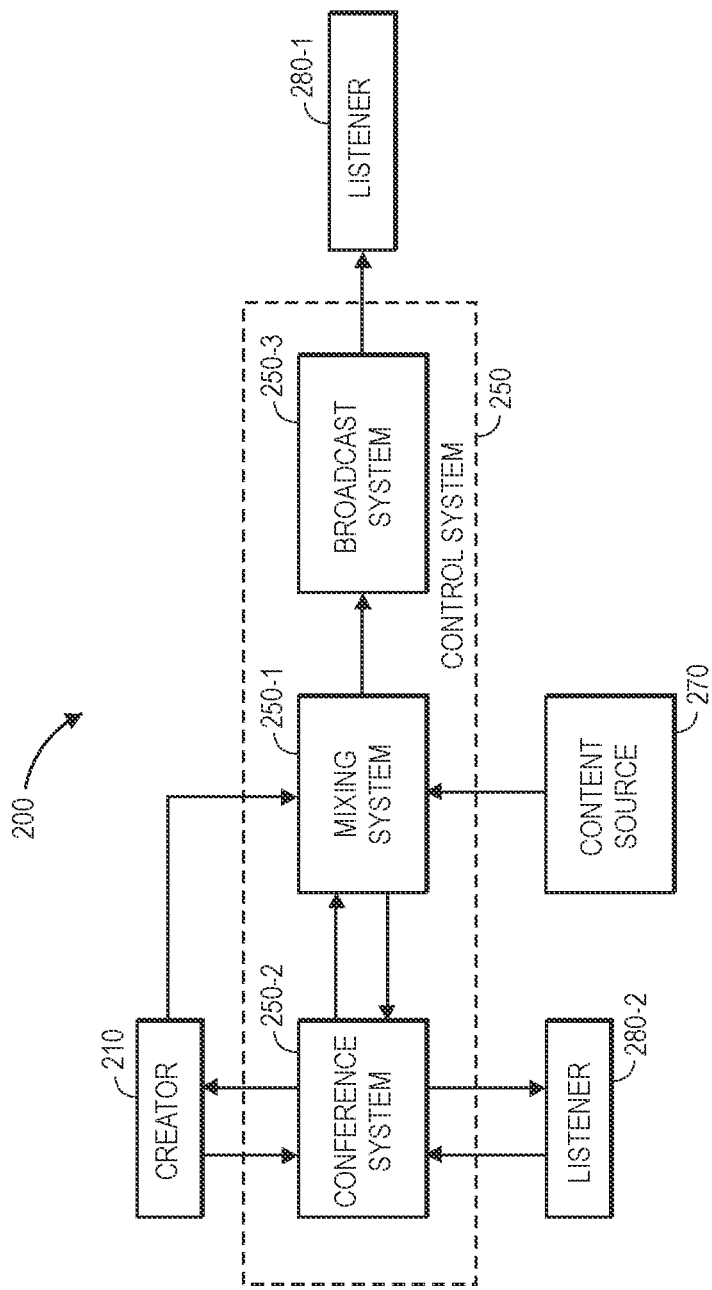

Referring to FIGS. 2A and 2B, block diagrams of components of one system 200 for scoring participants in accordance with embodiments of the present disclosure is shown. Except where otherwise noted, reference numerals preceded by the number "2" shown in FIG. 2A or FIG. 2B indicate components or features that are similar to components or features having reference numerals preceded by the number "1" shown in FIGS. 1A through 1F.

As is shown in FIG. 2A, the system 200 shown in FIG. 2A includes a creator 210, a control system 250, a content source 270, and a listener 280 that are connected to one another over one or more networks 290.

The creator 210 may be any individual or entity that expresses an interest or an intent in constructing a media program including media content, and providing the media program to the listener 280 over the network 290. As is shown in FIG. 2A, the creator 210 is associated with or operates a computer system 212 having a microphone 214, a display 215, a speaker 216 and a transceiver 218, and any other components.

In some implementations, the computer system 212 may be a mobile device, such as a smartphone, a tablet computer, a wristwatch, or others. In some other implementations, the computer system 212 may be a laptop computer or a desktop computer, or any other type or form of computer. In still other implementations, the computer system 212 may be, or may be a part of, a smart speaker, a television, an automobile, a media player, or any other type or form of system having one or more processors, memory or storage components (e.g., databases or other data stores), or other components.

The microphone 214 may be any sensor or system for capturing acoustic energy, including but not limited to piezoelectric sensors, vibration sensors, or other transducers for detecting acoustic energy, and for converting the acoustic energy into electrical energy or one or more electrical signals. The display 215 may be a television system, a monitor or any other like machine having a screen for viewing rendered video content, and may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 215 may be configured to receive content from any number of sources via one or more wired or wireless connections, e.g., the control system 250, the content source 270 or the listener 280, over the networks 290.

In some implementations, the display 215 may be an interactive touchscreen that may not only display information or data but also receive interactions with the information or data by contact with a viewing surface. For example, the display 215 may be a capacitive touchscreen that operates by detecting bioelectricity from a user, or a resistive touchscreen including a touch-sensitive computer display composed of multiple flexible sheets that are coated with a resistive material and separated by an air gap, such that when a user contacts a surface of a resistive touchscreen, at least two flexible sheets are placed in contact with one another.

The speaker 216 may be any physical components that are configured to convert electrical signals into acoustic energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters.

The transceiver 218 may be configured to enable the computer system 212 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 218 may further include or be in communication with one or more input/output (or "I/O") interfaces, network interfaces and/or input/output devices, and may be configured to allow information or data to be exchanged between one or more of the components of the computer system 212, or to one or more other computer devices or systems (e.g., other aerial vehicles, not shown) via the network 290. The transceiver 218 may perform any necessary protocol, timing or other data transformations in order to convert data signals from a first format suitable for use by one component into a second format suitable for use by another component. In some embodiments, the transceiver 218 may include support for devices attached through various types of peripheral buses, e.g., variants of the Peripheral Component Interconnect (PCI) bus standard or the Universal Serial Bus (USB) standard. In some other embodiments, functions of the transceiver 218 may be split into two or more separate components.

In some implementations, the computer system 212 may include a common frame or housing that accommodates the microphone 214, the display 215, the speaker 216 and/or the transceiver 218. In some implementations, applications or functions or features described as being associated with the computer system 212 may be performed by a single system. In some other implementations, however, such applications, functions or features may be split among multiple systems. For example, an auxiliary system, may perform one or more of such applications or functions, or include one or more features, of the computer system 212 or other computer systems or devices described herein, and may exchange any information or data that may be associated with such applications, functions or features with the computer system 212, as necessary. Alternatively, or additionally, the computer system 212 may include one or more power supplies, sensors (e.g., visual cameras or depth cameras), feedback devices (e.g., haptic feedback systems), chips, electrodes, clocks, boards, timers or other relevant features (not shown).

In some implementations, the computer system 212 may be programmed or configured to render one or more user interfaces on the display 215 or in any other manner, e.g., by a browser or another application. The computer system 212 may receive one or more gestures or other interactions with such user interfaces, and such gestures or other interactions may be interpreted to generate one or more instructions or commands that may be provided to one or more of the control system 250, the content source 270 or the listener 280. Alternatively, or additionally, the computer system 212 may be configured to present one or more messages or information to the creator 210 in any other manner, e.g., by voice, and to receive one or more instructions or commands from the creator 210, e.g., by voice.

The control system 250 may be any single system, or two or more of such systems, that is configured to establish or terminate channels or connections with or between the creator 210, the content source 270 or the listener 280, to initiate a media program, or to control the receipt and transmission of media content from one or more of the creator 210, the content source 270 or the listener 280 to the creator 210, the content source 270 or the listener 280. The control system 250 may operate or include a networked computer infrastructure, including one or more physical computer servers 252 and data stores 254 (e.g., databases) and one or more transceivers 256, that may be associated with the receipt or transmission of media or other information or data over the network 290. The control system 250 may also be provided in connection with one or more physical or virtual services configured to manage or monitor such files, as well as one or more other functions. The servers 252 may be connected to or otherwise communicate with the data stores 254 and may include one or more processors. The data stores 254 may store any type of information or data, including media files or any like files containing multimedia (e.g., audio and/or video content), for any purpose. The servers 252 and/or the data stores 254 may also connect to or otherwise communicate with the networks 290, through the sending and receiving of digital data.

In some implementations, the control system 250 may be independently provided for the exclusive purpose of managing the monitoring and distribution of media content. Alternatively, the control system 250 may be operated in connection with one or more physical or virtual services configured to manage the monitoring or distribution of media files, as well as one or more other functions. Additionally, the control system 250 may include any type or form of systems or components for receiving media files and associated information, data or metadata, e.g., over the networks 290. For example, the control system 250 may receive one or more media files via any wired or wireless means and store such media files in the one or more data stores 254 for subsequent processing, analysis and distribution. In some embodiments, the control system 250 may process and/or analyze media files, such as to add or assign metadata, e.g., one or more tags, to media files.

The control system 250 may further broadcast, air, stream or otherwise distribute media files maintained in the data stores 254 to one or more listeners, such as the listener 280 or the creator 210, over the networks 290. Accordingly, in addition to the server 252, the data stores 254, and the transceivers 256, the control system 250 may also include any number of components associated with the broadcasting, airing, streaming or distribution of media files, including but not limited to transmitters, receivers, antennas, cabling, satellites, or communications systems of any type or form. Processes for broadcasting, airing, streaming and distribution of media files over various networks are well known to those skilled in the art of communications and thus, need not be described in more detail herein.

The content source 270 may be a source, repository, bank, or other facility for receiving, storing or distributing media content, e.g., in response to one or more instructions or commands from the control system 250. The content source 270 may receive, store or distribute media content of any type or form, including but not limited to advertisements, music, news, sports, weather, or other programming. The content source 270 may include, but need not be limited to, one or more servers 272, data stores 274 or transceivers 276, which may have any of the same attributes or features of the servers 252, data stores 254 or transceivers 256, or one or more different attributes or features.

In some embodiments, the content source 270 may be an Internet-based streaming content and/or media service provider that is configured to distribute media over the network 290 to one or more general purpose computers or computers that are dedicated to a specific purpose.

For example, in some embodiments, the content source 270 may be associated with a television channel, network or provider of any type or form that is configured to transmit media files over the airwaves, via wired cable television systems, by satellite, over the Internet, or in any other manner. The content source 270 may be configured to generate or transmit media content live, e.g., as the media content is captured in real time or in near-real time, such as following a brief or predetermined lag or delay, or in a pre-recorded format, such as where the media content is captured or stored prior to its transmission to one or more other systems. For example, the content source 270 may include or otherwise have access to any number of microphones, cameras or other systems for capturing audio, video or other media content or signals. In some embodiments, the content source 270 may also be configured to broadcast or stream one or more media files for free or for a one-time or recurring fees. In some embodiments, the content source 270 may be associated with any type or form of network site (e.g., a web site), including but not limited to news sites, sports sites, cultural sites, social networks or other sites, that streams one or more media files over a network. In essence, the content source 270 may be any individual or entity that makes media files of any type or form available to any other individuals or entities over one or more networks 290.

The listener 280 may be any individual or entity having access to one or more computer devices 282, e.g., general purpose or special purpose devices, who has requested (e.g., subscribed to) media content associated with one or more media programs over the network 290. For example, the computer devices 282 may be at least a portion of an automobile, a desktop computer, a laptop computer, a media player, a smartphone, a smart speaker, a tablet computer, a television, or a wristwatch, or any other like machine that may operate or access one or more software applications, and may be configured to receive media content, and present the media content to the listener 280 by one or more speakers, displays or other feedback devices. The computer device 282 may include a microphone 284, a display 285, a speaker 286, a transceiver 288, or any other components described herein, which may have any of the same attributes or features of the computer device 212, the microphone 214, the display 215, the speaker 216 or the transceiver 218 described herein, or one or more different attributes or features. In accordance with the present disclosure, a listener 280 that requests to receive media content associated with one or more media programs may also be referred to as a "subscriber" to such media programs or media content.

Those of ordinary skill in the pertinent arts will recognize that the computer devices 212, 282 may include any number of hardware components or operate any number of software applications for playing media content received from the control system 250 and/or the media sources 270, or from any other systems or devices (not shown) connected to the network 290.

Moreover, those of ordinary skill in the pertinent arts will further recognize that, alternatively, in some implementations, the computer device 282 need not be associated with a specific listener 280. For example, the computer device 282 may be provided in a public place, beyond the control of the listener 280, e.g., in a bar, a restaurant, a transit station, a shopping center, or elsewhere, where any individuals may receive one or more media programs.

The networks 290 may be or include any wired network, wireless network, or combination thereof, and may comprise the Internet, intranets, broadcast networks, cellular television networks, cellular telephone networks, satellite networks, or any other networks, for exchanging information or data between and among the computer systems or devices of the creator 210, the control system 250, the media source 270 or the listener 280, or others (not shown). In addition, the network 290 may be or include a personal area network, local area network, wide area network, cable network, satellite network, cellular telephone network, or combination thereof, in whole or in part. The network 290 may also be or include a publicly accessible network of linked networks, possibly operated by various distinct parties, such as the Internet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

Although the system 200 shown in FIG. 2A shows boxes for one creator 210, one control system 250, one media source 270, one listener 280, and one network 290, those of ordinary skill in the pertinent arts will recognize that any number of creators 210, broadcast systems 250, media sources 270, listeners 280 or networks 290 may be utilized to transmit, receive, access, hear, or view media content provided in accordance with implementations of the present disclosure. Moreover, the computer devices 212, 252, 272, 282 may include all or fewer of the components shown in FIG. 2A or perform all or fewer of the tasks or functions described herein. Tasks or functions described as being executed or performed by a single system or device associated with the creator 210, the control system 250, the media source 270 or the listener 280 may be executed or performed by multiple systems or devices associated with each of the creator 210, the control system 250, the media source 270 or the listener 280. For example, the tasks or functions described herein as being executed or performed by the control system 250 may be performed by a single system, or by separate systems for establishing two-way connections with the creator 210 or any number of media sources 270, or any other systems, e.g., a mixing system, or for establishing one-way connections with any number of media sources 270 or any number of listeners 280 and transmitting data representing media content, e.g., a broadcast system, from such media sources 270 to such listeners 280. Moreover, two or more creators 210 may collaborate on the construction of a media program.

In some implementations, one or more of the tasks or functions described as being executed or performed by the control system 250 may be performed by multiple systems. For example, as is shown in FIG. 2B, the system 200 may include a mixing system 250-1, a conference system 250-2 and a broadcast system 250-3 that may perform one or more of the tasks or functions described herein as being executed or performed by the control system 250.

As is further shown in FIG. 2B, the mixing system 250-1 may be configured to receive data from the conference system 250-2, as well as from one or more content sources 270. For example, in some implementations, the conference system 250-2 may also be configured to establish two-way communications channels with computer devices or systems associated with the creator 210 (or any number of creators) as well as a listener 280-2 (or any number of listeners) or other authorized host, guests, or contributors to a media program associated with one or more of the creators 210, and form a "conference" including each of such devices or systems. The conference system 250-2 may receive data representing media content such as audio signals in the form of words spoken or sung by one or more of the creator 210, the listener 280-2, or other entities connected to the conference system 250-2, or music or other media content played by the one or more of the creator 210, the listener 280-2, or such other entities, and transmit data representing the media content or audio signals to each of the other devices or systems connected to the conference system 250-2.

In some implementations, the mixing system 250-1 may also be configured to establish a two-way communications channel with the conference system 250-2, thereby enabling the mixing system 250-1 to receive data representing audio signals from the conference system 250-2, or transmit data representing audio signals to the conference system 250-2. For example, in some implementations, the mixing system 250-1 may act as a virtual participant in a conference including the creator 210 and any listeners 280-2, and may receive data representing audio signals associated with any participants in the conference, or provide data representing audio signals associated with media content of the media program, e.g., media content received from any of the content sources 270, to such participants.

The mixing system 250-1 may also be configured to establish a one-way communications channel with the content source 270 (or with any number of content sources), thereby enabling the mixing system 250-1 to receive data representing audio signals corresponding to advertisements, songs or media files, news programs, sports programs, weather reports or any other media files, which may be live or previously recorded, from the content source 270. The mixing system 250-1 may be further configured to establish a one-way communications channel with the broadcast system 250-3, and to transmit data representing media content received from the creator 210 or the listener 280-2 by way of the conference channel 250-2, or from any content sources 270, to the broadcast system 250-3 for transmission to any number of listeners 280-1.

The mixing system 250-1 may be further configured to receive information or data from one or more devices or systems associated with the creator 210, e.g., one or more instructions for operating the mixing system 250-1. For example, in some implementations, the mixing system 250-1 may be configured to cause any number of connections to be established between devices or systems and one or more of the conference system 250-2 or the broadcast system 250-3, or for causing data representing media content of any type or form to be transmitted to one or more of such devices or systems in response to such instructions. In some implementations, the mixing system 250-1 may also be configured to initiate or modify the playing of media content, such as by playing, pausing or stopping the media content, advancing (e.g., "fast-forwarding") or rewinding the media content, increasing or decreasing levels of volume of the media content, or setting or adjusting any other attributers or parameters (e.g., treble, bass, or others) of the media content, in response to such instructions or automatically.

The broadcast system 250-3 may be configured to establish one-way communications channels with any number of listeners 280-1, and to transmit data representing media content received from the mixing system 250-1 to each of such listeners 280-1.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The computer devices 212, 282 or the servers 252, 272, and any associated components, may use any web-enabled or Internet applications or features, or any other client-server applications or features including E-mail or other messaging techniques, to connect to the networks 290, or to communicate with one another, such as through short or multimedia messaging service (SMS or MMS) text messages. For example, the computer devices 212, 282 or the servers 252, 272 may be configured to transmit information or data in the form of synchronous or asynchronous messages to one another in real time or in near-real time, or in one or more offline processes, via the networks 290. Those of ordinary skill in the pertinent art would recognize that the creator 210, the control system 250 (or the mixing system 250-1, the conference system 250-2, or the broadcast system 250-3), the media source 270 or the listener 280 (or the listeners 280-1, 280-2) may include or operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as computer devices 212, 282 or the servers 252, 272, or to any other computers or control systems utilized by the creator 210, the control system 250 (or the mixing system 250-1, the conference system 250-2, or the broadcast system 250-3), the media source 270 or the listener 280 (or the listeners 280-1, 280-2), and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMS, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

Figure 3:
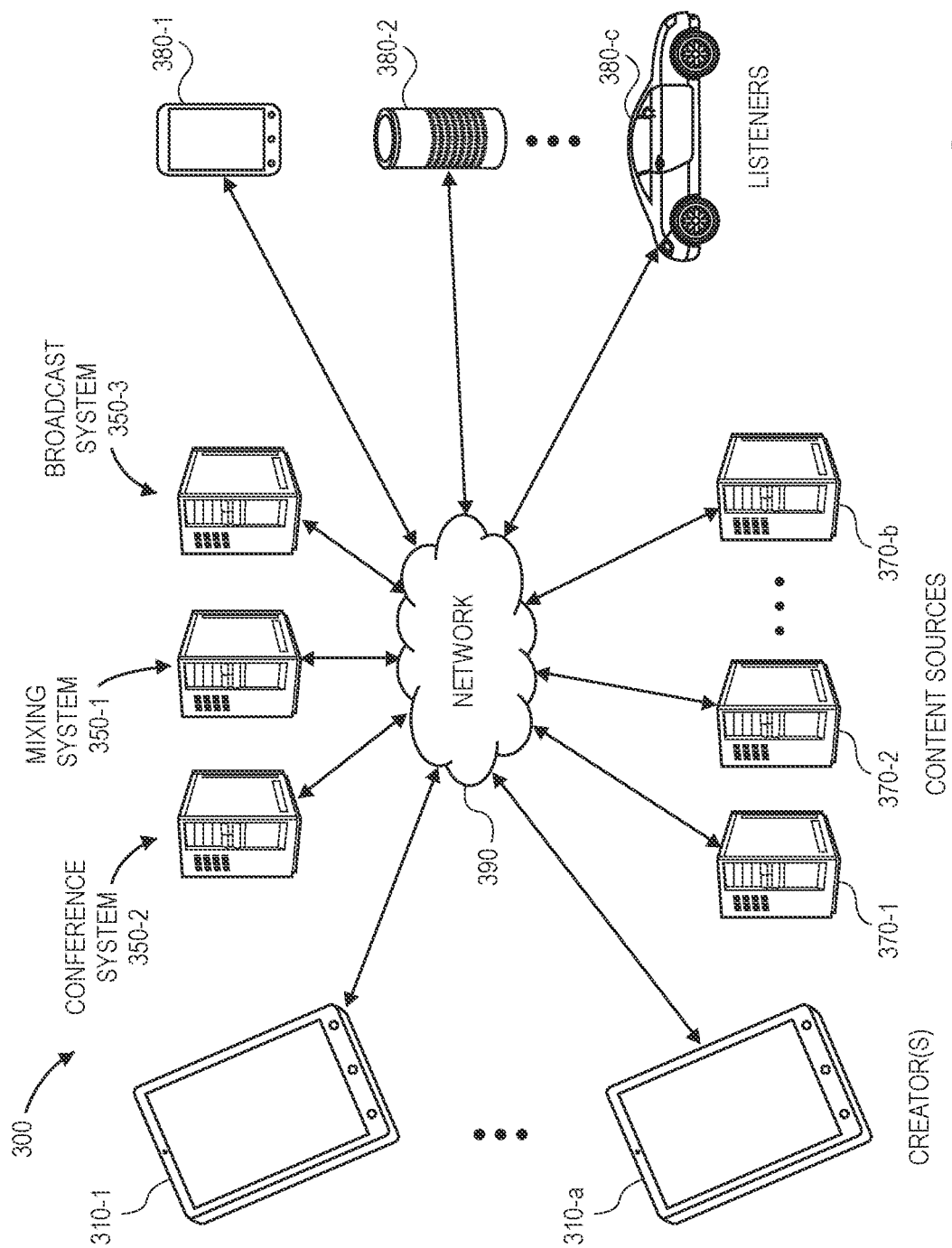
FIG. 3 is a view of aspects of one system for scoring participants in accordance with embodiments of the present disclosure.

Referring to FIG. 3, a view of aspects of one system for scoring participants in accordance with embodiments of the present disclosure is shown. Except where otherwise noted, reference numerals preceded by the number "3" shown in FIG. 3 indicate components or features that are similar to components or features having reference numerals preceded by the number "2" shown in FIG. 2A or FIG. 2B or by the number "1" shown in FIGS. 1A through 1F. As is shown in FIG. 3, the system 300 includes computer systems or devices of a plurality of creators 310-1 . . . 310-a, a mixing system 350-1, a conference system 350-2, a broadcast system 350-3, a plurality of content sources 370-1, 370-2 . . . 370-b and a plurality of listeners 380-1, 380-2 . . . 380-c that are connected to one another over a network 390, which may include the Internet in whole or in part.

The creators 310-1 . . . 310-a may operate a computer system or device having one or more microphones, an interactive display, one or more speakers, one or more processors and one or more transceivers configured to enable communication with one or more other computer systems or devices. In some implementations, the creators 310-1 . . . 310-a may operate a smartphone, a tablet computer or another mobile device, and may execute interactions with one or more user interfaces rendered thereon, e.g., by a mouse, a stylus, a touchscreen, a keyboard, a trackball, or a trackpad, as well as any voice-controlled devices or software (e.g., a personal assistant). Interactions with the user interfaces may be interpreted and transmitted in the form of instructions or commands to the mixing system 350-1, the conference system 350-2 or the broadcast system 350-3. Alternatively, the creators 310-1 . . . 310-a may operate any other computer system or device, e.g., a laptop computer, a desktop computer, a smart speaker, a media player, a wristwatch, a television, an automobile, or any other type or form of system having one or more processors, memory or storage components (e.g., databases or other data stores), or other components.

Additionally, the mixing system 350-1 may be any server or other computer system or device configured to receive information or data from the creators 310-1 . . . 310-a, or any of the listeners 380-1, 380-2 . . . 380-c, e.g., by way of the conference system 350-2, or from any of the media sources 370-1, 370-2 . . . 370-b over the network 390. The mixing system 350-1 may be further configured to transmit any information or data to the broadcast system 350-3 over the network 390, and to cause the broadcast system 350-3 to transmit any of the information or data to any of the listeners 380-1, 380-2 . . . 380-c, in accordance with a broadcast plan (or a sequence of media content, or another schedule), or at the direction of the creators 310-1 . . . 310-a. The mixing system 350-1 may also transmit or receive information or data along such communication channels, or in any other manner. The operation of the mixing system 350-1, e.g., the establishment of connections, or the transmission and receipt of data via such connections, may be subject to the control or discretion of any of the creators 310-1 . . . 310-a.

In some implementations, the mixing system 350-1 may receive media content from one or more of the media sources 370-1, 370-2 . . . 370-b, and cause the media content to be transmitted to one or more of the creators 310-1 . . . 310-a or the listeners 380-1, 380-2 . . . 380-c by the broadcast system 350-3. In some other implementations, the mixing system 350-1 may receive media content from one or more of the media sources 370-1, 370-2 . . . 370-b, and mix, or combine, the media content with any media content received from the creators 310-1 . . . 310-a or any of the listeners 380-1, 380-2 . . . 380-c, before causing the media content to be transmitted to one or more of the creators 310-1 . . . 310-a or the listeners 380-1, 380-2 . . . 380-c by the conference system 350-2 or the broadcast system 350-3. For example, in some implementations, the mixing system 350-1 may receive media content (e.g., audio content and/or video content) captured live by one or more sensors of one or more of the media sources 370-1, 370-2 . . . 370-b, e.g., cameras and/or microphones provided at a location of a sporting event, or any other event, and mix that media content with any media content received from any of the creators 310-1 . . . 310-a or any of the listeners 380-1, 380-2 . . . 380-c. In such embodiments, the creators 310-1 . . . 310-a may act as sportscasters, news anchors, weathermen, reporters or others, and may generate a media program that combines audio or video content captured from a sporting event or other event of interest, along with audio or video content received from one or more of the creators 310-1 . . . 310-a or any of the listeners 380-1, 380-2 . . . 380-c before causing the media program to be transmitted to the listeners 380-1, 380-2 . . . 380-c by the conference system 350-2 or the broadcast system 350-3.

In some implementations, the conference system 350-2 may establish two-way communications channels between any of the creators 310-1 . . . 310-a and, alternatively, any of the listeners 380-1, 380-2 . . . 380-c, who may be invited or authorized to participate in a media program, e.g., by providing media content in the form of spoken or sung words, music, or any media content, subject to the control or discretion of the creators 310-1 . . . 310-a. Devices or systems connected to the conference system 350-2 may form a "conference" by transmitting or receiving information or data along such communication channels, or in any other manner. The operation of the mixing system 350-1, e.g., the establishment of connections, or the transmission and receipt of data via such connections, may be subject to the control or discretion of the creators 310-1 . . . 310-a. In some implementations, the mixing system 350-1 may effectively act as a virtual participant in such a conference, by transmitting media content received from any of the media sources 370-1, 370-2 . . . 370-b to the conference system 350-2 for transmission to any devices or systems connected thereto, and by receiving media content from any of such devices or systems by way of the conference system 350-2 and transmitting the media content to the broadcast system 350-3 for transmission to any of the listeners 380-1, 380-2 . . . 380-c.

Likewise, the broadcast system 350-3 may be any server or other computer system or device configured to receive information or data from the mixing system 350-1, or transmit any information or data to any of the listeners 380-1, 380-2 . . . 380-c over the network 390. In some implementations, the broadcast system 350-3 may establish one-way communications channels with the mixing system 350-1 or any of the listeners 380-1, 380-2 . . . 380-c in accordance with a broadcast plan (or a sequence of media content, or another schedule), or at the direction of the creators 310-1 . . . 310-a. The broadcast system 350-3 may also transmit or receive information or data along such communication channels, or in any other manner. The operation of the broadcast system 350-3, e.g., the establishment of connections, or the transmission of data via such connections, may be subject to the control or discretion of the creators 310-1 . . . 310-a.

The content sources 370-1, 370-2 . . . 370-b may be servers or other computer systems having media content stored thereon, or access to media content, that are configured to transmit media content to the creators 310-1 . . . 310-a or any of the listeners 380-1, 380-2 . . . 380-c in response to one or more instructions or commands from the creators 310-1 . . . 310-a or the mixing system 350-1. The media content stored on or accessible to the content sources 370-1, 370-2 . . . 370-b may include one or more advertisements, songs or media files, news programs, sports programs, weather reports or any other media files, which may be live or previously recorded. The number of content sources 370-1, 370-2 . . . 370-b that may be accessed by the mixing system 350-1, or the types of media content stored thereon or accessible thereto, is not limited.

The listeners 380-1, 380-2 . . . 380-c may also operate any type or form of computer system or device configured to receive and present media content, e.g., at least a portion of an automobile, a desktop computer, a laptop computer, a media player, a smartphone, a smart speaker, a tablet computer, a television, or a wristwatch, or others.

The mixing system 350-1, the conference system 350-2 or the broadcast system 350-3 may establish or terminate connections with the creators 310-1 . . . 310-a, with any of the content sources 370-1, 370-2 . . . 370-b, or with any of the listeners 380-1, 380-2 . . . 380-c, as necessary, to compile and seamlessly transmit media programs over digital channels (e.g., web-based or application-based), to devices of the creators 310-1 . . . 310-a or the listeners 380-1, 380-2 . . . 380-c in accordance with a broadcast plan, or subject to the control of the creators 310-1 . . . 310-a. Furthermore, in some implementations, one or more of the listeners 380-1, 380-2 . . . 380-c, e.g., musicians, celebrities, personalities, athletes, politicians, or artists, may also be content sources. For example, where the broadcast system 350-3 has established one-way channels, e.g., broadcast channels, with any of the listeners 380-1, 380-2 . . . 380-c, the mixing system 350-1 may terminate one of the one-way channels with one of the listeners 380-1, 380-2 . . . 380-c, and cause the conference system 350-2 to establish a two-directional channel with that listener, thereby enabling that listener to not only receive but also transmit media content to the creators 310-1 . . . 310-a or any of the other listeners.

Those of ordinary skill in the pertinent arts will recognize that any of the tasks or functions described above with respect to the mixing system 350-1, the conference system 350-2 or the broadcast system 350-3 may be performed by a single device or system, e.g., a control system, or by any number of devices or systems.

Figure 4A:
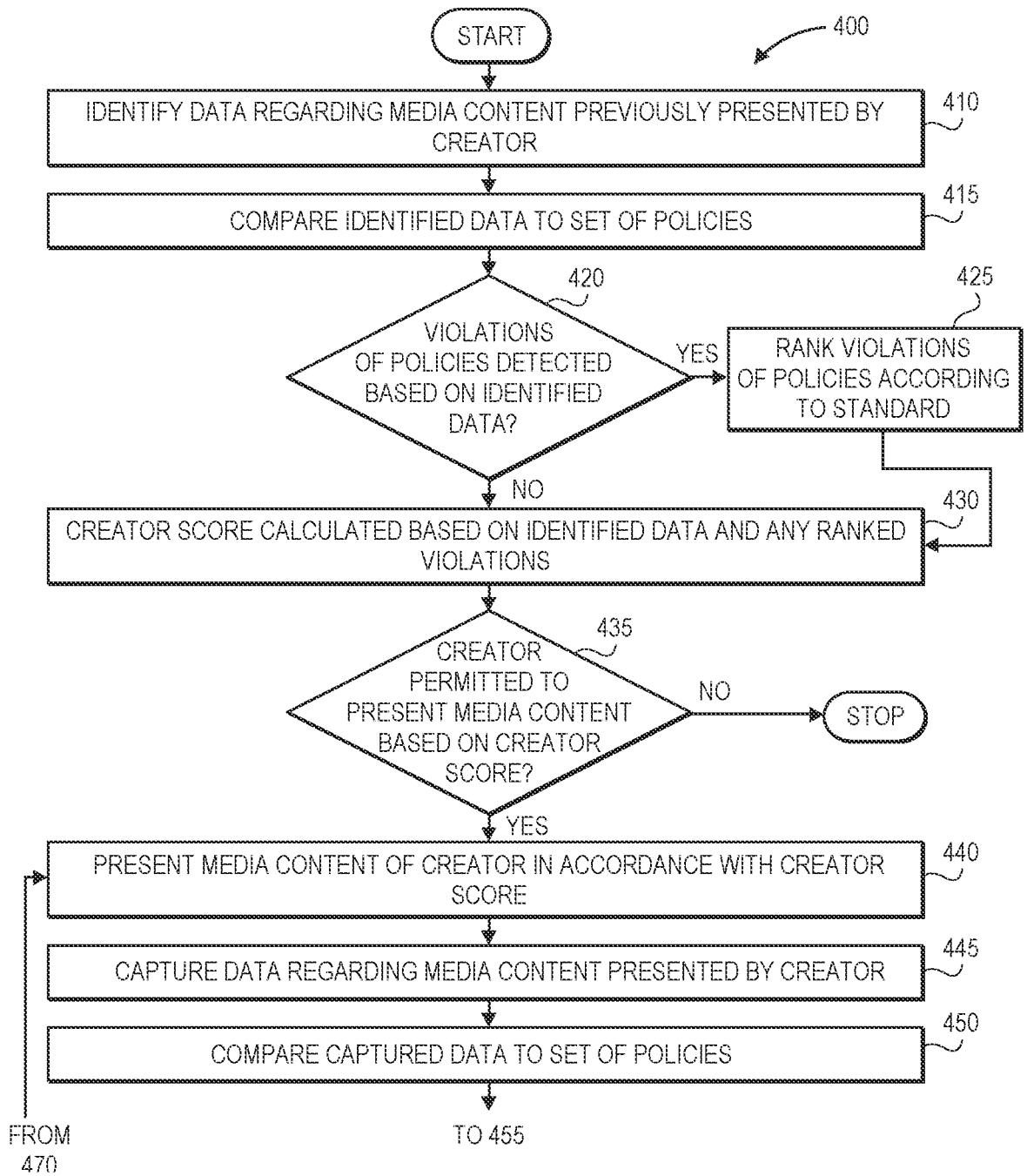
FIGS. 4A and 4B are a flow chart of one process for scoring participants in accordance with embodiments of the present disclosure.
Figure 4B:
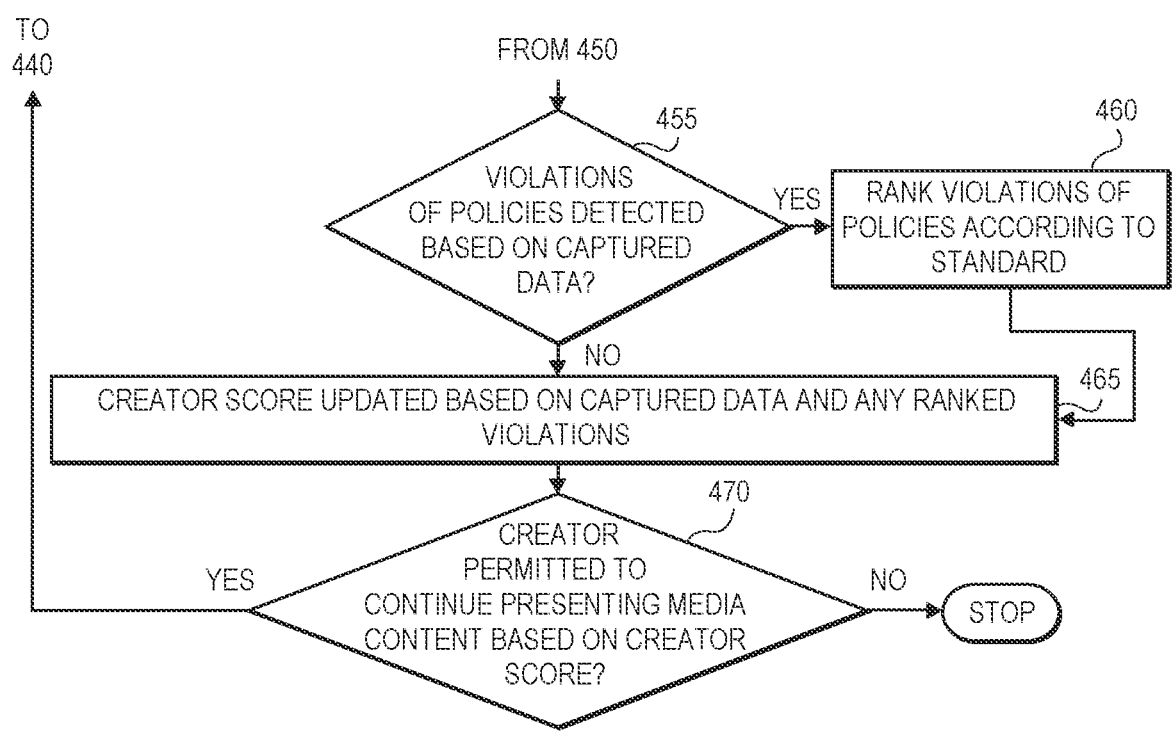

Referring to FIGS. 4A and 4B, a flow chart 400 of one process for scoring participants in accordance with embodiments of the present disclosure is shown.

At box 410, data regarding media content previously presented by a creator is identified. For example, in some implementations, the data may include audio data representing the media content that is received from the creator and/or transmitted to devices of one or more listeners to one or more episodes of a media program, any of which may include the media content. In some other implementations, the data may include a transcript or set of words (or text) derived from such audio data, or a sentiment or opinion represented in the transcript or the media content, which may be determined in any manner. The data may be identified in real time or near-real time, e.g., as the media content is generated by the creator or any other participants, or at any time after the media content has been generated and presented or transmitted to listeners.

The data may be identified at box 410 in any manner. For example, in some implementations, the data may be stored on or accessible to a system that is or was responsible for presenting the media content to listeners, e.g., a control system, a broadcast system, a mixing system, a conference system, or any other system that transmitted the data to such listeners. Alternatively, or additionally, the data may be retrieved from such a system by another system, e.g., a third-party system associated with a service that is dedicated to or responsible for generating scores representing risks that creators may violate one or more predetermined policies during the airing of media content of any type or form.

In some implementations, the data may include information or data representing reports received from listeners as to what they heard during a playing of the media content, including opinions of such listeners, including positive, negative, neutral or other opinions, or whether the listeners believe that the creator or another participant in an episode of the media program that included the media content may have committed violations of any number of policies, any of which may relate to general or specific restrictions on content that may be aired by creators, or any other restrictions. For example, during a playing of the media content, one or more listeners may have provided feedback in the form of chat messages, social media messages, interactions with icons associated with emotions or feelings (e.g., "emoji"), or others, and data regarding such feedback may be identified and associated with the media content.

In some implementations, one or more of such reports may have been received from the creator, who may provide information or data regarding media content of his or her own media program, e.g., a self-report, or information or data regarding media content provided by one or more guests during the media program.

In still other implementations, the data may include one or more images associated with the creator or the media content, such as "cover art," "album art," or other images that are commonly associated with the creator, with media programs of the creator in general, or with the media content for which the data was identified at box 410 in particular. For example, the data may include an image of the creator, an image of a guest associated with the media content, or any other images. Such images may be processed to determine or recognize the content thereof, e.g., according to one or more machine learning models.

In some other implementations, the data may include one or more words included in a title or a summary of a media program including the media content, or an episode of the media program.

Alternatively, or additionally, in some implementations, the data may include information or data regarding social media posts or other expressions by the creator or another participant in the media content. Such posts or expressions may include, but need not be limited to, posts or expressions made by the creator prior to airing the media content, while airing the media content, or after the media content has been aired. Such posts or expressions may include any publicly available information or data regarding the creator or any other participants in the generation of the media content, including but not limited to blogs, news stories or other records.

Moreover, alternatively, the data identified at box 410 may relate to a type of participant other than a creator, e.g., a guest, a listener, or any other participant.

At box 415, the data identified at box 410 is compared to each of the policies of a set. For example, in some implementations, one or more of the policies may include previously established provisions or restrictions regarding hate-based speech; content that constitutes harassment or defamation; content that is racist, ethnocentric or otherwise objectively deplorable; incitements to perform acts that would violate any standard, ordinance, regulation, statute or law; promotion of terrorism or other forms of violence; content of a sexual or mature nature; content that includes misinformation or demonstrably false information; or any other content. Alternatively, the policies may relate to any other attribute of media content, and may be based on any matter of public or private concern.

At box 420, whether any violations of any policies are detected based on the data identified at box 410 is determined. For example, a violation may be identified according to any number of rules, or based on outputs received from a machine learning model, to any degree or extent, or according to any objective or subjective criteria. For example, in some implementations, where the data identified at box 410 includes audio data previously presented to listeners, or a transcript derived from the audio data, or any other words, a violation of a policy may be identified where the audio data represents or the transcript includes as few as one word on a list of restricted words, or a predetermined number (e.g., a minimum threshold number) of such words. Alternatively, where the data identified at box 410 includes one or more images, a violation of a policy may be identified where such images are determined to depict violent content, sexual content, mature content, or other restricted content. Where the data identified at box 410 includes ratings or reviews of the media content received from listeners, a violation of a policy relating to content may be identified where as few as a single listener found the media content to be objectionable or improper, or where a predetermined number (e.g., a minimum threshold number) of listeners found the media content to be objectionable or improper. Alternatively, a violation of any policy may be identified in any manner and on any basis in accordance with implementations of the present disclosure.

If any violations of policies are detected at box 420, the process advances to box 425, where the policies are ranked according to an objective standard. In some implementations, each of the violations detected at box 420 may be assigned a score or value, e.g., within a range, indicative of a level or degree of seriousness or gravity of the violation, or a level or degree of anticipated harm resulting from the violation. For example, in some implementations, scores or values may be determined or assigned to every violation of any policy of the set in the same manner. Alternatively, or additionally, scores or values may be determined or assigned to violations based on the respective policies that were violated. For example, in some implementations, a single instance of racially or sexually charged content may be assigned a higher score or value than a single instance of profanity that is neither racially motivated nor sexually charged, or any other single violation or multiple violations.

If no violations of policies are detected at box 420, or after any such violations are ranked according to the standard at box 425, the process advances to box 430, where a creator score (or a score, a participant score, a notoriety score, a trust score, a safety score, or any other type or form of score) is calculated based on the data identified at box 410 and any violations of policies that were ranked at 425. For example, the creator score may be any qualitative or quantitative index or value indicating a likelihood that the creator will violate one or more of the policies of the set. In some implementations, the creator score may be calculated according to one or more sets of rules by providing scores or values determined for the violations of policies ranked at box 425 to an algorithm, an equation, or a formula, e.g., a weighted sum formula, and determining the creator score based on the algorithm, the equation or the formula. Alternatively, in some implementations, the creator score may be calculated by providing some or all of the data identified at box 410 or the violations of policies ranked at box 425 as inputs to a machine learning model, and determining the creator score based on an output received from the machine learning model. The creator score may be calculated in any other manner in accordance with implementations of the present disclosure.

The creator score may have any value or may be calculated according to any standard. For example, in some implementations, the creator score may be a value between zero and one, or a value within any other range. Alternatively, the creator score may be a percentile or share representing a reliability (or predictability) of the creator with respect to policies of the set, or an unreliability or (unpredictability) of the creator with respect to such policies.

At box 435, whether the creator is permitted to present media content is determined based on the creator score. For example, where the score generated at box 430 exceeds a minimum predetermined threshold or limit, or is less than a maximum predetermined threshold or limit, a predicted risk that the creator may violate one or more of the policies may be determined to be acceptable, and the creator may be permitted to present media content, e.g., to air one or more episodes of a media program. Alternatively, where the score generated at box 430 is below the minimum predetermined threshold or limit, or is above the maximum predetermined threshold or limit, the creator may not be permitted to present media content. Alternatively, the creator score may be used as a basis for generating a recommendation that the creator be permitted to present media content, or not be permitted to present media content, and the recommendation may be provided to any number of services for presenting media content to listeners.

In some implementations, such as where a creator is new, or where insufficient data regarding the creator is available to calculate a creator score, attributes of the creator may be identified and compared to attributes of creators for whom creator scores have been calculated. A creator score for one creator may be assigned to another creator, where the creators are determined to be similar to one another.

If the creator is not permitted to present media content based on the creator score, then the process ends.

If the creator is permitted to present media content, then the process advances to box 440, where the creator presents media content in accordance with the creator score. For example, where the creator score indicates that the creator poses a low risk of violating any of the policies of the set, the creator may be permitted to present media content, e.g., in one or more episodes of a media program, with minimal delay.

Alternatively, where the creator score indicates that the creator poses other than an insignificant risk of violating any of the policies of the set, yet the creator is permitted to present media content, one or more provisions may be instituted to address or mitigate the risk. For example, in some implementations, one or more automated systems may be programmed or configured to monitor media content of the creator more closely, with a high level of scrutiny, or with a low level of latency, such that any violations by the creator or any guests or other participants in the media program are identified and addressed more rapidly than violations by other creators or their guests. Alternatively, in some other implementations, restrictions may be placed on media content generated by the creator, such as one or more limitations on subject matter that the creator may include in media content, e.g., topics, skits, guests, media entities, or others. In still other implementations, media content generated by the creator may be limited to specific times or periods of day, e.g., time slots, which may be selected based on the creator score. For example, where a creator score indicates that the creator poses a risk of violating one or more policies, the creator may be limited to airing media content during evening or late-night hours, or on weekends.

At box 445, data regarding the media content presented by the creator is captured. For example, in some implementations, data may be captured in real time or near-real time as the media content is presented by the creator or listeners, or at any other time. The captured data may include the media content itself, e.g., audio data, a transcript of the audio data, or any opinions or sentiments expressed in the audio data or the transcript, as well as information or data regarding reports received from listeners, feedback, images, a title or summary of the media content, or any posts or other expressions by the creator or participants in the media content.

At box 450, the data captured at box 445 is compared to a set of policies, which may include the same policies to which the data identified at box 410 was compared at box 415, or one or more additional or fewer policies. The data may be compared to the policies in the same manner that the data identified at box 410 was compared to the policies at box 415, or in any other manner.

At box 455, whether any violations of any policies are detected based on the data captured at box 445 is determined. Such violations, if any, may be identified in the same manner that the violations were identified at box 420, or in any other manner.

If any violations of policies are detected at box 455, the process advances to box 460, where the policies are ranked according to an objective standard. The standard may be the same as the standard by which any violations were ranked at box 425, or any other standard.

If no violations of policies are detected at box 455, or after any such violations are ranked according to the standard at box 460, the process advances to box 465, where the creator score is updated based on the data captured at box 445 and any violations of policies that were ranked at box 460. For example, where the creator score was calculated according to an algorithm, an equation, or a formula at box 430, information or data regarding the data captured at box 445 or the violations ranked at box 460 may be provided to the same algorithm, equation, or formula, or a different algorithm, equation or formula, and the updated creator score may be determined accordingly. Alternatively, where the creator score was calculated based on an output received from a machine learning model, the data captured at box 445 and the violations ranked at box 460 may be provided to the same machine learning model, or to a different machine learning model, and the updated creator score may be calculated based on an output received in response to such inputs.

At box 470, whether the creator is permitted to continue presenting media content is determined based on the creator score updated at box 465. For example, the updated creator score may be compared to the same thresholds or limits discussed above with regard to box 435, or any different thresholds or limits, and a determination or a recommendation may be generated accordingly.

If the creator is permitted to continue presenting media content based on the creator score updated at box 465, then the process returns to box 440, where the creator presents media content in accordance with the creator score. If the creator is not permitted to continue presenting media content based on the creator score updated at box 465, then the process ends.

Figure 5A:
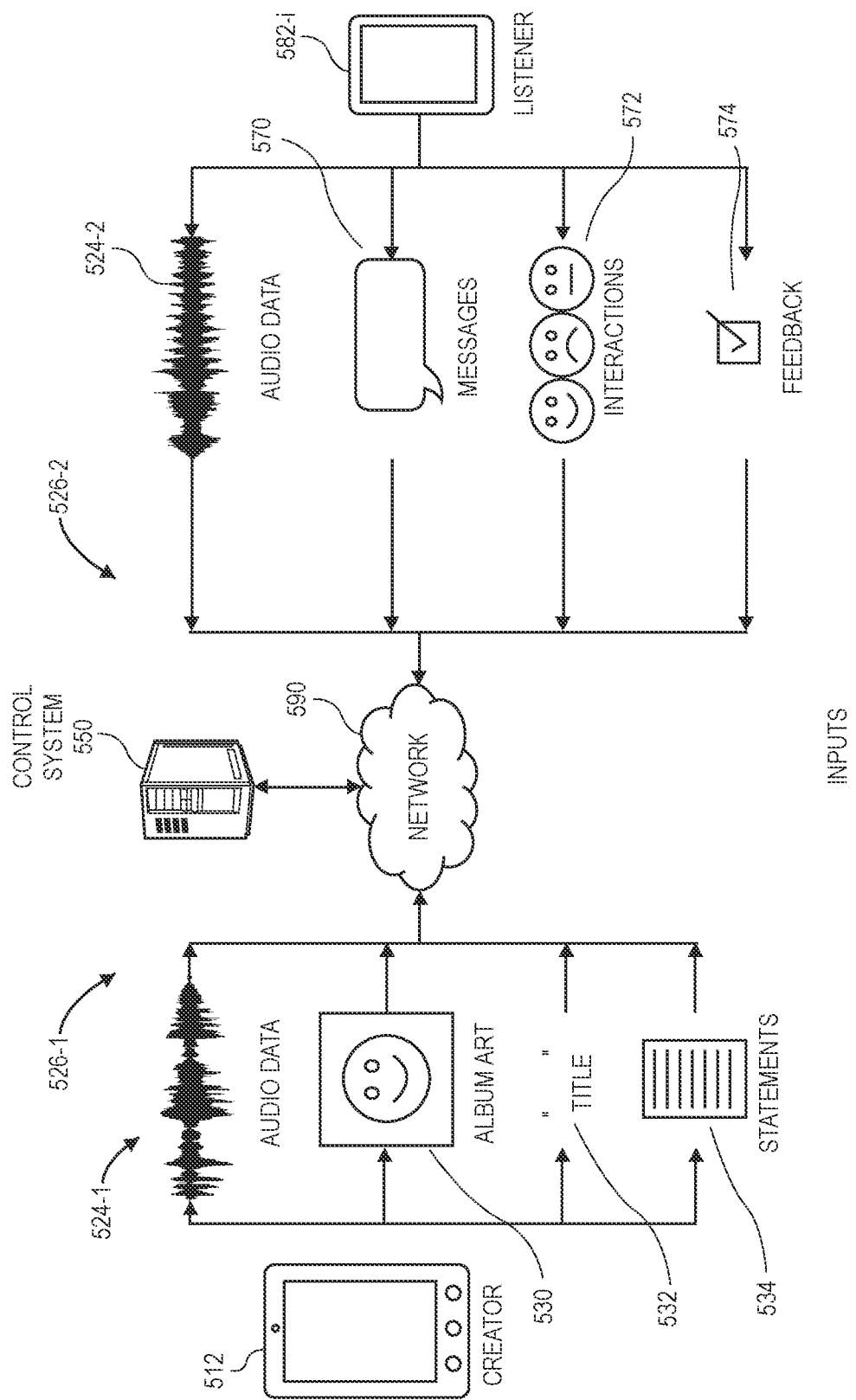
FIGS. 5A and 5B are views of aspects of one system for scoring participants in accordance with embodiments of the present disclosure.
Figure 5B:
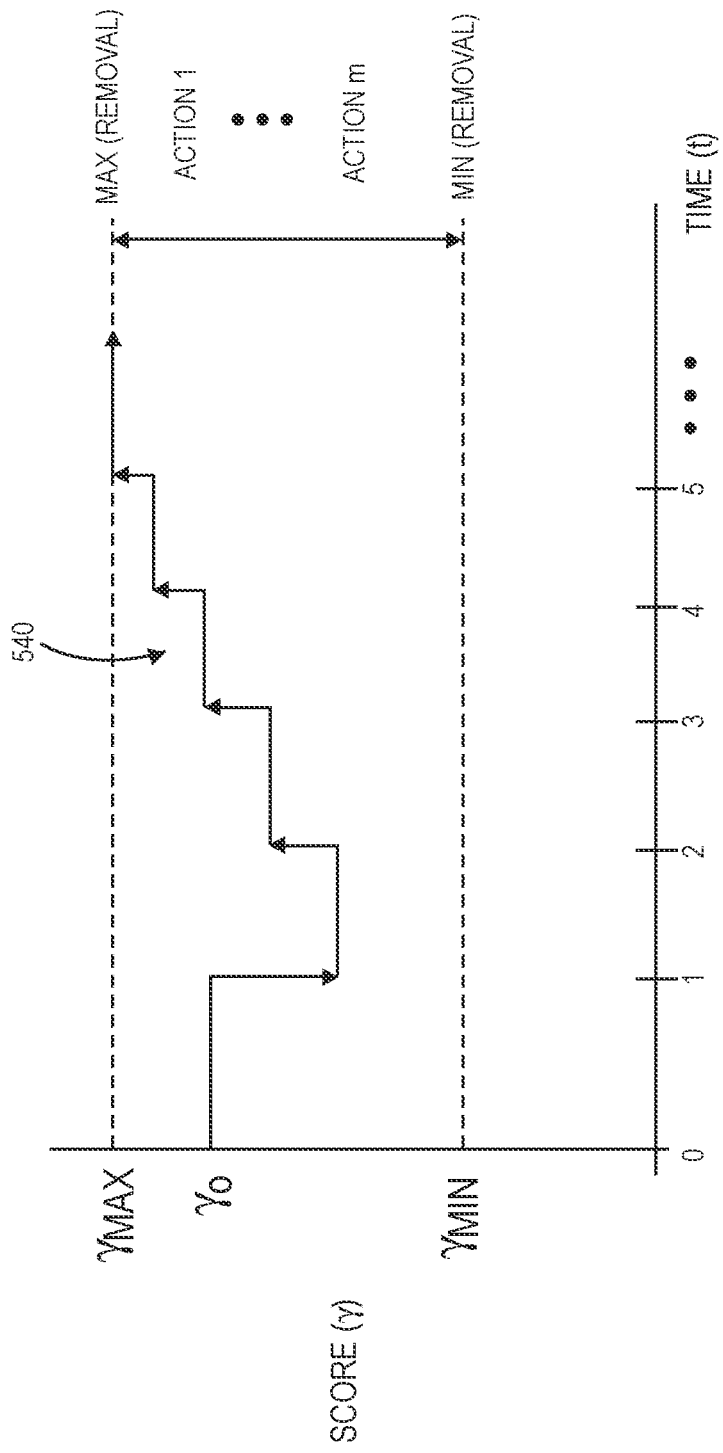

As is discussed above, a score representative of a risk that a creator may commit one or more violations of any policies may be calculated based on any number of inputs of information of data obtained from any number of sources. Referring to FIGS. 5A and 5B, a view of aspects of one system for scoring participants in accordance with embodiments of the present disclosure is shown. Except where otherwise noted, reference numerals preceded by the number "5" shown in FIGS. 5A and 5B indicate components or features that are similar to components or features having reference numerals preceded by the number "3" shown in FIG. 3, by the number "2" shown in FIG. 2A or FIG. 2B or by the number "1" shown in FIGS. 1A through 1F.

As is shown in FIG. 5A, a mobile device 512 of a creator may transmit information or data representing sets of inputs 526-1 of any type or form to a control system 550 associated with the presentation of media content (e.g., episodes of media programs) to listeners over a network 590 (or one or more networks), which may include the Internet in whole or in part. For example, as is shown in FIG. 5A, the inputs 526-1 may include audio data 524-1 captured by one or more microphones or other acoustic sensors of the mobile device 512, or by one or more peripherals to the mobile device 512, to the control system 550 over the network 590. The data 524-1 may have been processed and transmitted to one or more devices 582-*i* of listeners over the network 590. Additionally, the inputs 526-1 may further include one or more sets of words or text spoken by the creator, e.g., which may have been determined by providing the data 524-1 in real time or in near-real time to one or more speech recognition engines or any other techniques operated by the mobile device 512 or the control system 550.

The inputs 526-1 may also include one or more images 530 associated with the creator, e.g., "album art," or any other images, which may be processed to identify any individuals, objects, symbols (e.g., alphanumeric characters) or other content depicted therein. The inputs 526-1 may further include a title 532 (or a summary) associated with media content of the creator, e.g., a title of a media program, or an episode of the media program. The inputs 526-1 may also include any statements 534 that may have been made by the creator at any time, e.g., social media posts or other expressions, or that may relate to the creator in any way, e.g., blogs, news stories or other records.

As is further shown in FIG. 5A, a representative device 582-*i* of one listener may also transmit information or data representing sets of inputs 526-2 of any type or form to the control system 550 over the network 590 (or one or more networks), which may include the Internet in whole or in part. For example, the inputs 526-2 may include audio data 524-2 captured by one or more microphones or other acoustic sensors of the mobile device 582-*i*, or by one or more peripherals to the device 582-*i*, to the control system 550 over the network 590. The audio data 524-2 may be transmitted to the control system 550 in accordance with the media program, such as where a listener using the device 582-*i* is also a participant in the media program, or as feedback regarding the media program, such as where the listener using the device 582-*i* is not a participant in the media program.

Similarly, the inputs 526-2 may also include any number of messages 570 to the control system 550. Such messages 570 may include text messages, social media messages, electronic mail messages, or any other messages from a listener using the device 582-*i*. The inputs 526-2 may further include information or data regarding interactions 572 received from the listener using the device 582-*i*, e.g., contact with "emoji" or digital icons, images or symbols representative of emotions or opinions rendered on an interactive display. Alternatively, the interactions 572 may include contact with elements for playing, pausing, stopping, rewinding or fast-forwarding media content rendered on the interactive display.

The inputs 526-2 may also include any type of feedback 574 provided by a listener using the device 582-*i* to the control system 550. The feedback 574 may include responses to surveys or questionnaires, or any reports or other information or data provided by a listener using the device 582-*i* during the playing of media content therefrom. The feedback 574 may indicate a level of satisfaction with the media content, include a report of a possible violation of a policy by the creator or any participant, or any other information or data regarding the media content.

As is discussed above, a score (e.g., a creator score, a participant score, a trust score, a safety score, a notoriety score, or any other type or form of score) representing a risk that a creator may violate one or more policies may be calculated based on any of the inputs shown in FIG. 5A, or any other information or data. As is shown in FIG. 5B, a score 540, or γ, representing a risk that the creator may violate one or more policies is calculated and plotted over time. For example, as is shown in FIG. 5B, the score 540 may be assigned an initial value $\gamma_0$ at or prior to an initial presentation of media content to listeners. The initial value $\gamma_0$ of the score 540 may be a predetermined value initially assigned to creators, or may be calculated or selected for the creator on any basis, e.g., a similarity of the creator to any other creators.

Additionally, as is shown in FIG. 5B, the value of the score 540, or γ, may increase or decrease over time, based on changes in the values of the inputs received from the mobile device 512 of the creator, the devices 582-*i* of listeners, as is shown in FIG. 5A, or from any other source. For example, the score 540 may be calculated according to an equation 555, which may be a weighted sum equation that calculates the score 540 or value γ at any time as a sum of products of weights $w_i$ and values $v_i$, for n values representing some or all of the inputs shown in FIG. 5A. As is shown in FIG. 5B, the score 540 may be calculated on a regular or periodic basis, such that the score 540 is represented as a step function that changes abruptly from one value to another value. Alternatively, the score 540 may be calculated substantially continuously, such that the score 540 changes in real time or in near-real time as one or more of the various values $v_i$ change over time, and the score 540 is represented as a smooth, continuous function. Furthermore, in some implementations, the score 540 may be calculated based on an output received from a machine learning model in response to any of the inputs shown in FIG. 5A.

Variations in values of the score 540 may be associated with various actions, restrictions or other requirements regarding the presentation of media content by the creator. For example, where the score 540 represents a level of risk that the creator may violate one or more policies, the creator may be barred from presenting media content where the score 540 reaches a maximum value, or $\gamma_{MAX}$, representing an unacceptably high level of risk. Conversely, the creator may be permitted to present media content without any type or form of restriction where the score 540 reaches a minimum value, or $\gamma_{MIN}$, representing an insignificant or acceptable level of risk.

Alternatively, where the score 540 has a value, or $\gamma$, between the minimum value, or $\gamma_{MIN}$, and the maximum value, or $\gamma_{MAX}$, the score 540 may be associated with any number of actions 1 through m that the creator must perform in order to be able to present media content to listeners, or actions that are to be executed, e.g., by a control system, while the creator is presenting media content to listeners.

For example, in some implementations, where the score 540 is sufficiently high, but below the maximum value, or $\gamma_{MAX}$, one or more human-operated or automated systems may be programmed or configured to monitor media content of the creator more closely than media content of other creators or their guests. In some other implementations, media content that the creator may discuss during a media program may be limited to an extent defined by the score 540, in that the creator may be permitted to generate media content having subject matter of specific types or forms, e.g., topics, skits, guests, media entities, or others, and restricted from generating media content of other types or forms. In still other implementations, the creator may be limited to generating media content during specific periods of a day, e.g., time slots, such as during evening or late-night hours, or on weekends, where the score 540 is sufficiently high. Alternatively, the creator may be permitted to generate media content at any time of day where the score 540 is sufficiently low or equals the minimum value, or $\gamma_{MIN}$.

Likewise, in some implementations, media content of the creator may be limited to specific listeners or groups of listeners based on the score 540, e.g., to adults, or to listeners above specific ages. In some other implementations, where the score 540 is sufficiently high, but below the maximum value, or $\gamma_{MAX}$, an indicator, a grade, a warning, or a symbol representative of a risk that the creator is likely to violate one or more of the policies may be represented. For example, one or more user interfaces may be displayed on devices of listeners, or one or more electronic messages may be transmitted to such devices, indicating a level of risk associated with the creator or the media program. In some implementations, such user interfaces or messages may identify the score 540, e.g., by any qualitative or quantitative indicators.

The score 540 may be calculated or represented in any manner in accordance with implementations of the present disclosure. In some implementations, the score 540 may be calculated as a quantitative or qualitative value, such as is shown in FIG. 5B. In some other implementations, the score 540 may be represented as a ranking of a level of risk of the creator as a percentile or a share of levels of risk of all creators. Furthermore, although FIG. 5A shows only a single representative device 582-$i$ of a listener, the inputs 526-2 such as the audio data 524-2, the messages 570, the interactions 572, the feedback 574, or any other inputs may be received from any number of devices of any number of listeners in accordance with implementations of the present disclosure.

Figure 6B:
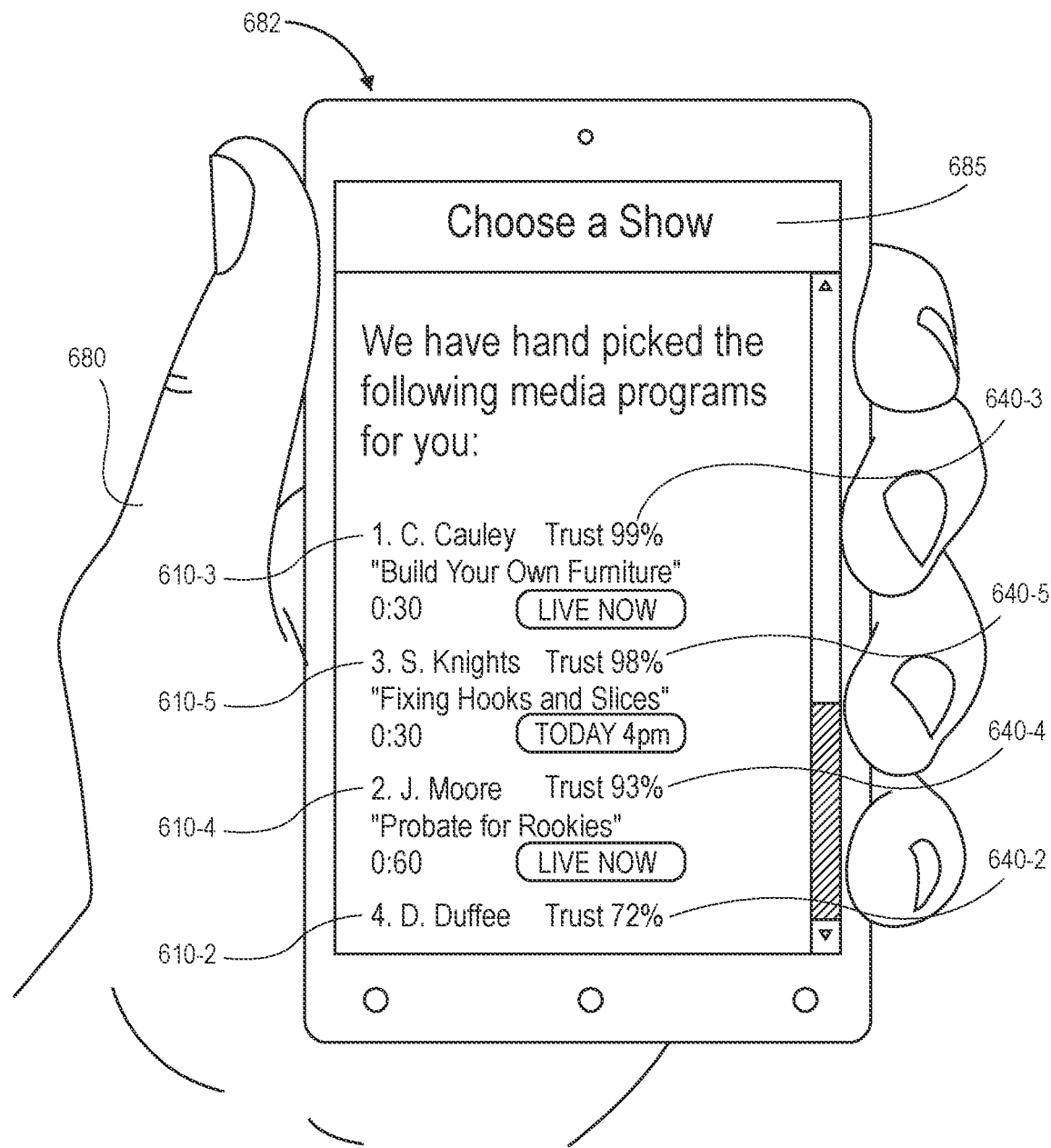

As is discussed above, the marketing or recommendation of media programs of creators to listeners may vary based on the levels of risk that the creators may commit one or more violations of established policies, as represented in one or more scores. Referring to FIGS. 6A and 6B, a view of aspects of one system for scoring participants in accordance with embodiments of the present disclosure is shown. Except where otherwise noted, reference numerals preceded by the number "6" shown in FIGS. 6A and 6B indicate components or features that are similar to components or features having reference numerals preceded by the number "5" shown in FIGS. 5A and 5B, by the number "3" shown in FIG. 3, by the number "2" shown in FIG. 2A or FIG. 2B or by the number "1" shown in FIGS. 1A through 1F.

As is shown in FIG. 6A, a plurality of creators 610-1, 610-2, 610-3, 610-4, 610-5 and their media programs are shown along with their respective relevance scores 642-1, 642-2, 642-3, 642-4, 642-5 and creator scores 640-1, 640-2, 640-3, 640-4, 640-5. The creator 610-1 is associated with a media program entitled "Cheating on Your Taxes: A Primer," while the creator 610-2 is associated with a media program entitled "Distrust Government and Media," the creator 610-3 is associated with a media program entitled "Build Your Own Furniture," the creator 610-4 is associated with a media program entitled "Probate for Rookies," and the creator 610-5 is associated with a media program entitled "Fixing Hooks and Slices."

The creators 610-1, 610-2, 610-3, 610-4, 610-5 are shown as ranked according to the relevance scores 642-1, 642-2, 642-3, 642-4, 642-5, which may represent a level of relevance to a specific listener, or to a group or type of listeners, and may be defined based on any attributes (e.g., ages, genders, locations, professions, or others). The relevance scores 642-1, 642-2, 642-3, 642-4, 642-5 may be calculated in any manner and on any basis. The creator scores 640-1, 640-2, 640-3, 640-4, 640-5 may represent a level of risk that each of the creators 610-1, 610-2, 610-3, 610-4, 610-5, respectively, may violate one or more policies during their respective media programs. The creator scores 640-1, 640-2, 640-3, 640-4, 640-5 may be calculated in any manner in accordance with the present disclosure, such as according to a weighted sum formula, or based on an output received from a machine learning model, or in any other manner. The creator scores 640-1, 640-2, 640-3, 640-4, 640-5 of FIG. 6A have values between zero and one, with a high value of a creator score representing a high level of confidence (or a low level of risk) that a corresponding one of the creators 610-1, 610-2, 610-3, 610-4, 610-5 will comply with (or not violate) each of a set of policies, and a low value representing a low level of confidence (or a high level of risk) that the corresponding one of the creators will comply with (or not violate) each of the set of policies. Alternatively, the creator scores 640-1, 640-2, 640-3, 640-4, 640-5 may have any other values, or may correspond to a level of confidence or risk in any other manner. For example, in some implementations, a high value of a creator score may represent a high level of risk (or a low level of confidence) that a corresponding creator will violate one or more policies, and a low value of a creator score may represent a low level of risk (or a high level of confidence) that the corresponding creator will violate one or more policies.

As is shown in FIG. 6A, the creator score 640-3 calculated for the creator 610-3 is the highest of the creator scores, or 0.99, thereby indicating that the creator 610-3 has a substantially low risk of violating one or more policies. The creator score 640-3 may have been calculated based on media content of prior episodes of the media program, which relates to home improvement, woodworking, or other related subjects, and is generally innocuous, or any other data regarding the creator 610-3 or his or her media program. Following closely after the creator score 640-3, the creator scores 640-5, 640-4 calculated for the creators 610-5, 610-4 are the next-highest of the creator scores, or 0.98 and 0.93, respectively, thereby indicating that the creators 610-5, 610-4 also have substantially low risks of violating any policies during the media programs, which relate to the practice of law in probate courts and golf training, respectively, and are likewise generally innocuous. The creator scores 640-4, 640-5 may have been calculated based on media content of prior episodes of the media programs of the creators 610-4, 610-5, or any other data regarding the creators 610-4, 610-5 or their media programs.

As is further shown in FIG. 6A, the creator score 640-2 calculated for the creator 610-2 is the second-lowest of the creator scores, or 0.72, thereby indicating that the creator 610-2 has a moderately high risk of violating one or more policies during his or her media program, which relates to anarchy. The creator score 640-1 calculated for the creator 610-1 is the lowest of the creator scores, or 0.62, thereby indicating that the creator 610-1 has the highest risk of violating one or more policies during his or her media program, which relates to illegal tax evasion. The creator scores 640-1, 640-2 may have been calculated based on media content of prior episodes of the media programs of the creators 610-1, 610-2, or any other data regarding the creators 610-1, 610-2, or their media programs.

As is further shown in FIG. 6A. the creators 610-1, 610-2, 610-3, 610-4, 610-5 and their media programs are also shown as having been ranked according to modified relevance scores 644-1, 644-2, 644-3, 644-4, 644-5 that consider not only a level of relevance of a creator and his or her media programs but also a level of risk that the creator will violate one or more policies during such media programs. Each of the modified relevance scores 644-1, 644-2, 644-3, 644-4, 644-5 is shown as a product of a creator score and a relevance score calculated for one of the creators. Alternatively, the modified relevance scores 644-1, 644-2, 644-3, 644-4, 644-5 may be calculated in any other manner, such as according to any algorithm, equation, or formula, other than a product of a creator score and a relevance score.

For example, despite being ranked third-highest in terms of overall relevance, the creator 610-3 is the highest-ranked creator in terms of both relevance and risk of violations, based on the modified relevance score 644-3. Likewise, the creator 610-5 and the creator 610-4 are the second-highest-ranked and third-highest-ranked creators in terms of modified relevance, respectively, based on the modified relevance scores 644-5, 644-4. The creator 610-2 and the creator 610-1 are the second-lowest-ranked and lowest-ranked creators in terms of modified relevance, respectively, based on the modified relevance scores 644-1, 644-2, despite having been the second-highest-ranked and highest-ranked creators in terms of relevance.

As is shown in FIG. 6B, media programs and creators may be marketed or promoted to listeners based on relevance and their respective levels of risk that such creators will violate one or more policies during their respective media programs. For example, as is shown in FIG. 6B, a mobile device 682 includes a user interface having a list of creators and media programs recommended to the listener 680 on an interactive display 685. The creator 610-3 and his or her media program are listed first, e.g., based on the modified relevance score 644-3, followed by the creators 610-5, 610-4, 610-2, respectively, based on their respective modified relevance scores 644-5, 644-4, 644-2. The user interface on the display 685 identifies the creators 610-3, 610-4, 610-5, 610-2 and titles and durations of their media programs.

The user interface on the display 685 further includes indicators of the values of the scores 640-3, 640-5, 640-4, 640-2 of the creators 610-3, 610-5, 610-4, 610-2, respectively, labeled as "trust" scores. For example, as is shown in FIG. 6B, the user interface on the display 685 indicates that the media program of the creator 610-3 is ninety-nine percent likely to not have a violation of any policies, and also that the media program of the creator 610-5 is ninety-eight percent likely to not have a violation of any policies, that the media program of the creator 610-4 is ninety-three percent likely to not have a violation of any policies, and that the media program of the creator 610-2 is seventy-two percent likely to not have a violation of any policies. Alternatively, the indicators of the values of the scores 640-3, 640-5, 640-4, 640-2 may take any other form.

The user interface on the display 685 also includes one or more interactive features that, when in response to one or more interactions with the display 685 by the listener 680, cause media content of media programs that are then being aired "live" to be transmitted to the mobile device 682, or cause information regarding media programs that will be aired at a later time to be transmitted to the mobile device 682. The listener 680 may further scroll or otherwise translate the user interface on the display 685 to view information or data regarding any other creators, viz., the creator 610-3, and their respective media programs.

Figure 7A:
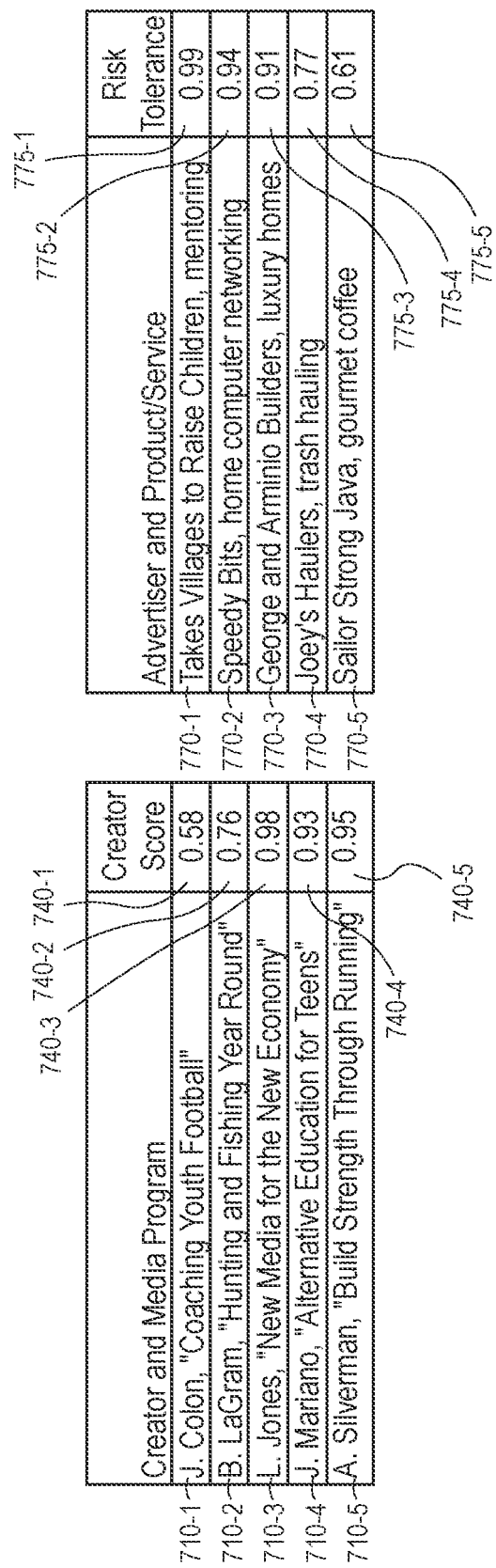
FIGS. 7A and 7B are views of aspects of one system for scoring participants in accordance with embodiments of the present disclosure.
Figure 7B:
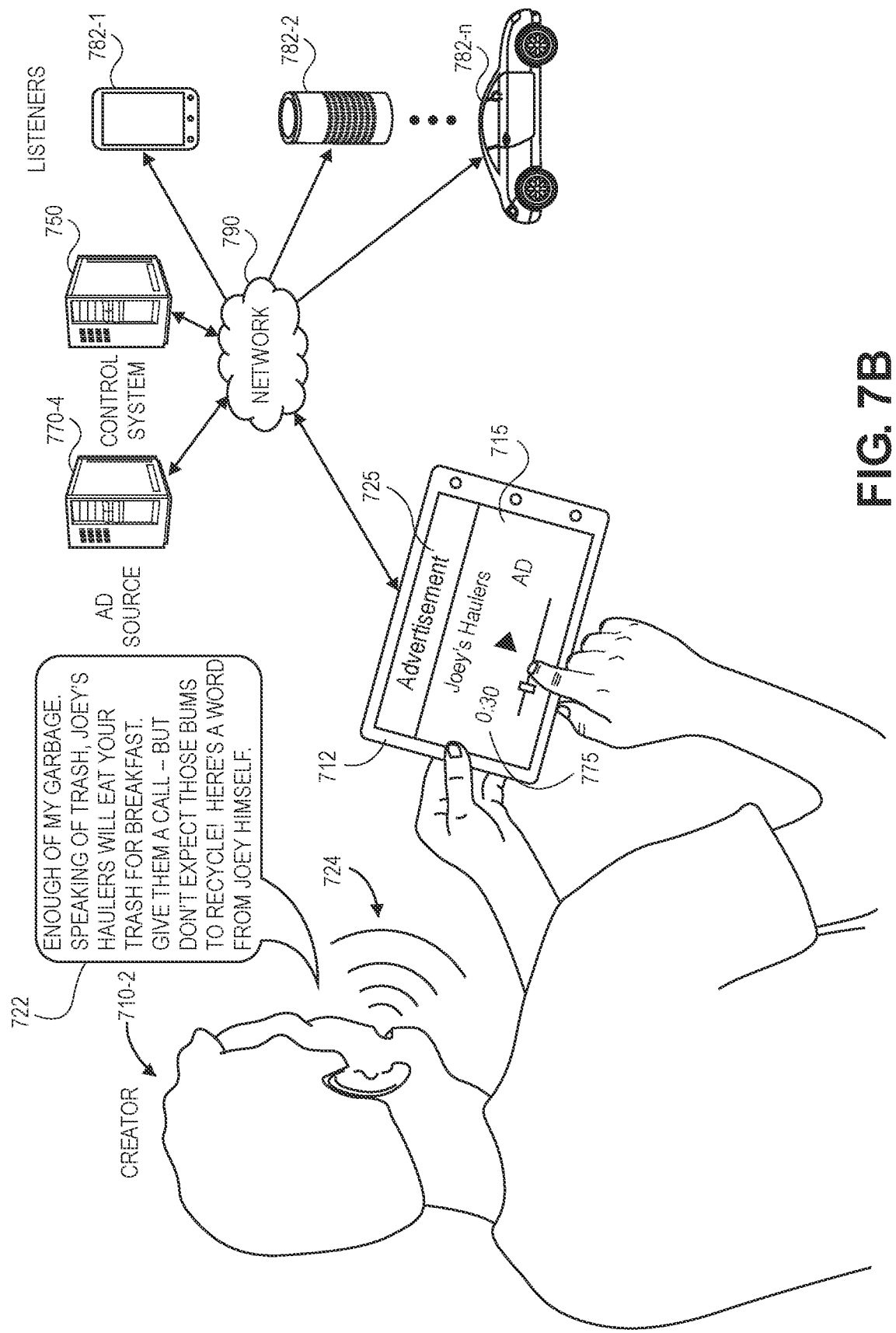

As is also discussed above, a creator may be paired with an advertiser (e.g., an entity) or one or more products or services where a level of risk that the creator will violate one or more policies, as represented in one or more scores, is consistent with a level of tolerance in such risk of the advertiser. Referring to FIGS. 7A and 7B, a view of aspects of one system for scoring participants in accordance with embodiments of the present disclosure is shown. Except where otherwise noted, reference numerals preceded by the number "7" shown in FIGS. 7A and 7B indicate components or features that are similar to components or features having reference numerals preceded by the number "6" shown in FIGS. 6A and 6B, by the number "5" shown in FIGS. 5A and 5B, by the number "3" shown in FIG. 3, by the number "2" shown in FIG. 2A or FIG. 2B or by the number "1" shown in FIGS. 1A through 1F.

As is shown in FIG. 7A, information regarding a plurality of creators 710-1, 710-2, 710-3, 710-4, 710-5 and titles of their respective media programs are shown, along with scores 740-1, 740-2, 740-3, 740-4, 740-5 representing a level of risk that one of the creators 710-1, 710-2, 710-3, 710-4, 710-5 will violate one or more policies during the airing of media content in accordance with their respective media programs. Additionally, information regarding a plurality of advertisers 770-1, 770-2, 770-3, 770-4, 770-5, each of which may be any entity such as an individual, a business, a non-profit organization, a governmental agency or institution, or any other entity, is also shown along with values 775-1, 775-2, 775-3, 775-4, 775-5 representing levels of tolerance of risk for each of the advertisers 770-1, 770-2, 770-3, 770-4, 770-5. For example, some of the advertisers 770-1, 770-2, 770-3, 770-4, 770-5 may be risk-averse entities that have low or no tolerance for any form of violation of any policy, or for any association of such violations with their products or services. Alternatively, some of the advertisers 770-1, 770-2, 770-3, 770-4, 770-5 may be more accommodating of or willing to accept violations of any policies, or unafraid of or unconcerned for any associations of violations with their products or services.

An advertiser may be selected for a creator of a media program based on a similarity of or proximity between a level of risk of violations of the creator and a level of tolerance of risk of the advertiser. For example, referring again to FIG. 7A, where the creator 710-2 has a creator score 740-2 of 0.76, the creator 710-2 may be paired with the advertiser 770-4, which has a value 775-4 of risk tolerance that is approximately equal to the creator score 740-2, or 0.77. Thus, advertisements of the advertiser 770-4 may be recommended for inclusion in media programs of the creator 710-2, based on similarities between the level of risk of the creator 710-2 represented in the creator score 740-2 and the level of tolerance for risk of the advertiser 770-4 represented in the value 775-4.

As is shown in FIG. 7B, the creator 710-2 is presenting media content via a mobile device 712 to devices 782-1, 782-2 . . . 782-n or other systems of any number n of listeners via a network 790 (or one or more networks), which may include the Internet in whole or in part. The mobile device 712 may be a smartphone, a tablet computer, a laptop computer, or any other system or device that is connected to a control system 750 and the advertiser 770-4, or a source of media content associated with the advertiser 770-4, over the network 790.

The mobile device 712 includes a user interface 725 rendered on a display 715 that includes one or more interactive features that, when selected, cause one or more advertisements or other media content to be transmitted from the advertiser 770-4 to the devices 782-1, 782-2 . . . 782-n by way of the control system 750 or in any other manner.

As is further shown in FIG. 7B, the creator 710 provides an utterance 722 of one or more words that are intended to be heard by one or more listeners using the devices 782-1, 782-2 . . . 782-n. In particular, the utterance 722 segues into an advertisement of the advertiser 770-4, viz., "enough of my garbage. Speaking of trash, Joey's Haulers will eat your trash for breakfast. Give them a call—but don't expect those bums to recycle! Here's a word from Joey himself," and initiates a playing of the advertisement by or from the advertiser 770-4 with one or more interactions with the user interface 725 on the display 715. Such interactions may cause media content representing the advertisement to be transmitted to the devices 782-1, 782-2 . . . 782-n.

Figure 8:
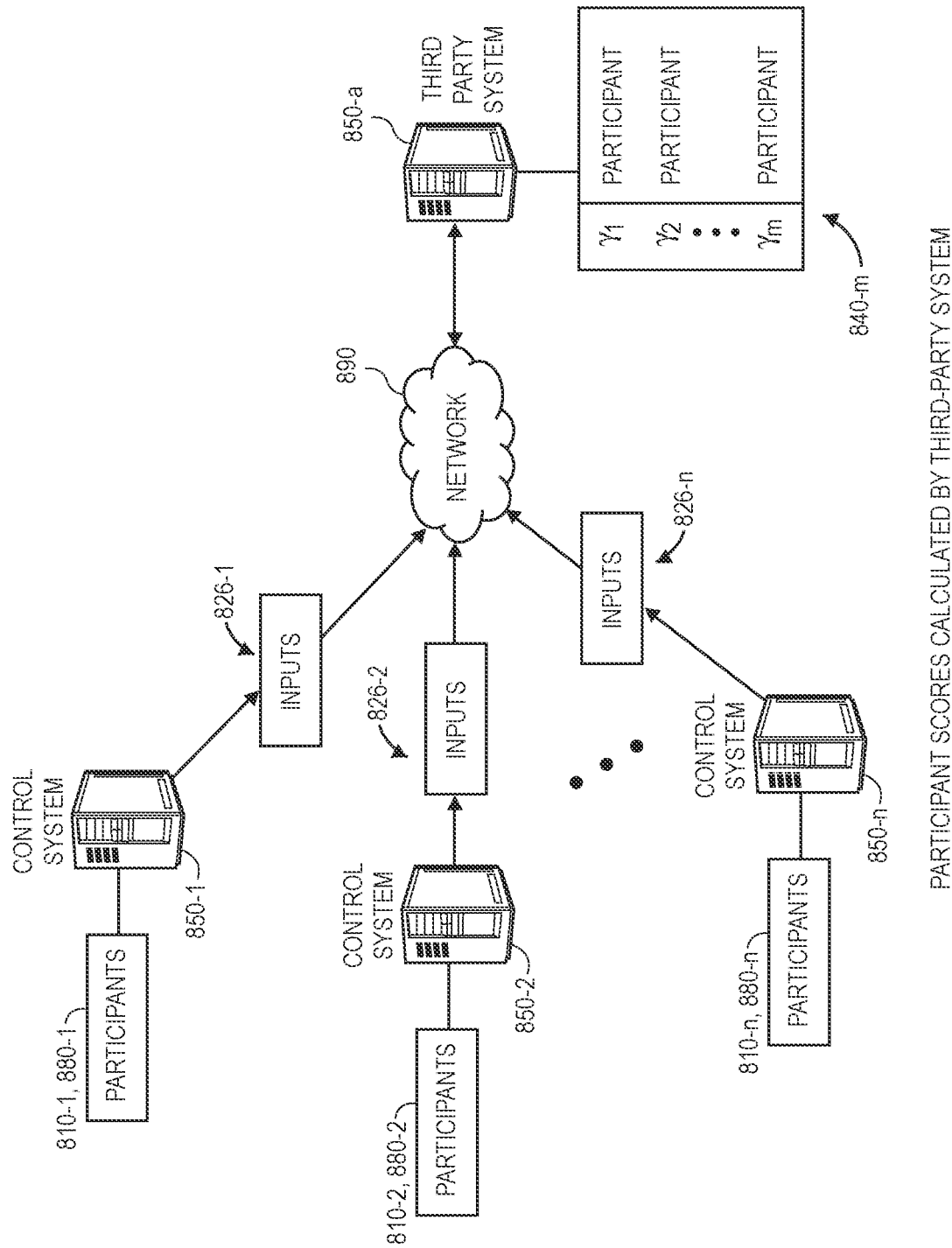
FIG. 8 is a view of aspects of one system for scoring participants in accordance with embodiments of the present disclosure.

As is discussed above, scores representing a level or risk that a participant will comply with each of a plurality of policies, e.g., a creator score, a guest score, a participant score, a trust score, a safety score, a notoriety score, or any other type or form of score, may be calculated by a third-party entity or system and provided to any entity or system associated with the transmission of media content to listeners. Referring to FIG. 8, a view of aspects of one system for scoring participants in accordance with embodiments of the present disclosure is shown. Except where otherwise noted, reference numerals preceded by the number "8" shown in FIG. 8 indicate components or features that are similar to components or features having reference numerals preceded by the number "7" shown in FIGS. 7A and 7B, by the number "6" shown in FIGS. 6A and 6B, by the number "5" shown in FIGS. 5A and 5B, by the number "3" shown in FIG. 3, by the number "2" shown in FIG. 2A or FIG. 2B or by the number "1" shown in FIGS. 1A through 1F.

As is shown in FIG. 8, a plurality of control systems 850-1, 850-2 . . . 850-n are in communication with a third-party system 850-a over a network 890 (or one or more networks), which may include the Internet in whole or in part. The control system 850-1 is in communication with a plurality of participants 810-1, 880-1, e.g., creators and/or guests or listeners, while the control system 850-2 is in communication with a plurality of participants 810-2, 880-2 and the control system 850-n is in communication with a plurality of participants 810-n, 880-n.

Each of the control systems 850-1, 850-2 . . . 850-n transmits sets of inputs 826-1, 826-2 . . . 826-n to the control system 850-a over the network 890. The sets of inputs 826-1, 826-2 . . . 826-n may include any of the inputs 526-1, 526-2 shown in FIG. 5A, or any other information or data regarding media content generated by any of the participants 810-1, 880-1, 810-2, 880-2, 810-n, 880-n.

Upon receiving the sets of inputs 826-1, 826-2 . . . 826-n, the third-party system 850-a may process the inputs to generate participant scores 840-m for each of the m participants associated with the sets of inputs 826-1, 826-2 . . . 826-n. For example, based on the inputs 826-1, 826-2 . . . 826-n, the third-party system 850-a may calculate the participant scores 840-m by providing one or more of the sets of inputs 826-1, 826-2 . . . 826-n to an algorithm, an equation, or a formula, e.g., a weighted sum formula, or as inputs to a machine learning model, and determine the participant scores 840-m based on outputs received from the machine learning model.

Subsequently, where a participant for which one of the participant scores 840-m has been calculated requests or intends to generate media content as a creator, a guest, or in any other role, and have the media content transmitted by a control system, e.g., one or more of the control systems 850-1, 850-2 . . . 850-n or any other devices or systems (not shown), or entities associated with such devices or systems may request and/or receive a participant score for that participant. The control system may then transmit media content of the participant in accordance with the participant score, as is described herein or in any other manner.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Likewise, although some of the embodiments described herein or shown in the accompanying figures refer to media programs including audio content, the systems and methods disclosed herein are not so limited, and the media programs described herein may include any type or form of media content, including not only audio but also video, which may be transmitted to and played on any number of devices of any type or form.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow chart shown in FIGS. 4A and 4B, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit(s) of a reference number identify a figure or figures in which the reference number first appears, while two rightmost digits of a reference number in a figure indicate a component or a feature that is similar to components or features having reference numbers with the same two rightmost digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A first computer system comprising at least one data store and at least one computer processor,
    wherein the first computer system is connected to one or more networks,
    wherein the at least one data store has one or more sets of instructions stored thereon that, when executed by the at least one computer processor, cause the first computer system to perform a method comprising:
        receiving first data from a second computer system associated with a creator of a media program, wherein the first data comprises a first plurality of words spoken or sung by the creator during at least a first episode of the media program;
        transmitting at least some of the first data to at least some of a first plurality of computer systems associated with listeners to the media program;
        processing the first data to recognize at least some of the first plurality of words;
        identifying a plurality of policies associated with the presentation of media content to listeners;
        determining at least one violation of at least one of the plurality of policies based at least in part on the first plurality of words;
        generating a score associated with the creator based at least in part on the at least one violation;
        selecting at least one of a time of a day or a day of a week for the media program based at least in part on the score;
        receiving second data from the second computer system, wherein the second data comprises a second plurality of words spoken or sung by the creator during at least a second episode of the media program; and
        transmitting at least some of the second data to at least some of a second plurality of computer systems associated with listeners to the media program in accordance with the score, wherein the at least some of the second data is transmitted during a period of time including at least one of the time of the day or the day of the week.

2. The first computer system of claim 1, wherein the at least one of the plurality of policies is a restriction on a plurality of objectionable words, and
wherein determining the at least one violation of the at least one of the plurality of policies comprises:
determining that the first plurality of words includes at least one of the plurality of objectionable words.

3. The first computer system of claim 1, wherein the method further comprises:
processing the second data to recognize at least some of the second plurality of words;
determining that none of the plurality of policies was violated during the second episode of the media program based at least in part on the second plurality of words; and
updating the score associated with the creator in response to determining that none of the plurality of policies was violated during the second episode.

4. The first computer system of claim 1, wherein the plurality of policies comprises at least one of:
a restriction on hate-based speech;
a restriction on harassment;
a restriction on defamation;
a restriction on racist content; or
a restriction on incitements to violate at least one of a standard, an ordinance, a regulation, a statute or a law.

5. A method comprising:
identifying, by at least a first computer system, first data representing media content of a media program associated with a first creator, wherein the first data comprises at least one of:
first audio data generated by at least the first creator during a first period of time; or
a first transcript of at least a portion of the first audio data;
determining, by the first computer system, a comparison of at least a portion of the first data to each of a plurality of policies associated with media content;
identifying, by the first computer system, at least one violation of at least a first policy of the plurality of policies by the first creator during the first period of time based at least in part on the comparison;
generating, by the first computer system, a first score associated with a risk that the first creator will violate at least one of the plurality of policies in second data generated during a second period of time, wherein the second period of time follows the first period of time;
storing, by the first computer system, the first score in association with the first creator;
selecting, by the first computer system, at least one of a time of a day or a day of a week for the media program based at least in part on the first score;
receiving, by the first computer system, second data representing media content of the media program associated with the first creator, wherein the second data comprises second audio data generated by at least the first creator during the second period of time, wherein the second period of time includes the at least one of the time of the day or the day of the week, and wherein the second data is received from a second computer system associated with the first creator; and
transmitting, by the first computer system, at least a portion of the second data to each of a plurality of computer systems, wherein each of the plurality of computer systems is associated with at least one listener to the media program.

6. The method of claim 5, further comprising:
determining, by the first computer system, a value associated with the at least one violation,
wherein the first score is generated based at least in part on the value.

7. The method of claim 5, wherein the first score is calculated according to a weighted sum equation or a machine learning model.

8. The method of claim 5, further comprising:
determining, by the first computer system, that the first creator is permitted to generate media content associated with the media program at the at least one of the time of the day or the day of the week based at least in part on the first score.

9. The method of claim 8, further comprising:
determining, by the first computer system, a second transcript of at least a portion of the second audio data;
determining, by the first computer system, a comparison of at least a portion of second data to each of the plurality of policies, wherein the second data comprises the second audio data and the second transcript;
identifying, by the first computer system, at least one violation of at least the first policy or a second policy of the plurality of policies by the first creator during the second period of time based at least in part on the comparison;
generating, by the first computer system, a second score associated with a risk that the first creator will violate at least one of the plurality of policies in third data generated during a third period of time, wherein the third period of time follows the second period of time; and
storing, by the first computer system, the second score in association with the first creator.

10. The method of claim 5, further comprising:
providing, by the first computer system, information regarding the first score to at least a second computer system, wherein the second computer system is configured to transmit media content of the media program to at least a plurality of computer systems, wherein each of the plurality of computer systems is associated with at least one listener to the media program;
determining, by the second computer system, that the first creator is permitted to generate media content associated with the media program at the at least one of the time of the day or the day of the week based at least in part on the first score.

11. The method of claim 5, wherein the plurality of policies comprises at least one of:
a restriction on hate-based speech;
a restriction on harassment;
a restriction on defamation;
a restriction on racist content; or
a restriction on incitements to violate at least one of a standard, an ordinance, a regulation, a statute or a law.

12. The method of claim 5, wherein the first data further comprises at least one of:
an image associated with one of the first creator or the media program;
a title of the media program;
a summary of the media program;
a report received from the at least one listener;
a posting of information by the first creator; or
news regarding at least one of the first creator or the media program.

13. The method of claim 5, wherein determining the comparison of at least the portion of the first data to each of the plurality of policies associated with media content comprises:
   identifying, by the first computer system, a first set of words associated with at least the first policy, wherein the first policy is a restriction on each of the first set of words in media content; and
   determining, by the first computer system, that the first transcript includes at least one of the first set of words.

14. The method of claim 5, wherein determining the comparison of at least the portion of the first data to each of the plurality of policies associated with media content comprises:
   determining, by the first computer system, that the first transcript includes at least one incitement to violence.

15. The method of claim 5, wherein each of the plurality of computer systems is associated with at least one person of not less than the minimum age.

16. The method of claim 5, further comprising:
   identifying, by the first computer system, information regarding a plurality of media programs, wherein the media program associated with the first creator is one of the plurality of media programs;
   identifying, by the first computer system, scores associated with risks that creators of each of the plurality of media programs will violate at least one of the plurality of policies, wherein the first score is one of the scores;
   ranking, by the first computer system, each of the plurality of media programs based at least in part on the scores;
   transmitting, by the first computer system, information regarding at least some of the plurality of media programs to a second computer system, wherein the information regarding at least some of the plurality of media programs includes information regarding the media program associated with the first creator; and
   causing, by the second computer system, a display of at least some of the information regarding at least some of the plurality of media programs on at least one computer display,
   wherein the second computer system is one of the plurality of computer systems.

17. The method of claim 5, wherein the first score is one of:
   a quantitative measure of the risk;
   a qualitative measure of the risk; or
   a percentile representing the risk compared to risks that a plurality of creators will violate the at least one of the plurality of policies in data generated during at least the second period of time.

18. A method comprising:
   receiving, by a first computer system, a plurality of sets of data regarding media programs of creators, wherein each of the plurality of sets of data comprises:
      audio data generated by one of the creators; or
      a transcript of the audio data;
   determining, by the first computer system, comparisons of each of the plurality of sets of data to each of a plurality of policies associated with media content;
   identifying, by the first computer system, violations of at least some of the plurality of policies by at least one of the creators based at least in part on the comparisons;
   generating, by the first computer system, scores associated with risks that each of the creators will violate at least one of the plurality of policies in audio data; and
   storing, by the first computer system, each of the scores in association with each of the creators;
   providing, by the first computer system, a first score associated with a risk that a first creator will violate at least one of the plurality of policies in audio data to a second computer system;
   selecting, by the second computer system, at least one of a time of a day or a day of a week for the media program based at least in part on the first score;
   receiving, by the second computer system, audio data generated by the first creator from a third computer system associated with the first creator; and
   transmitting, by the second computer system, at least a portion of the audio data to a fourth computer system associated with a listener in accordance with the first score during a period of time comprising the at least one of the time of the day or the day of the week.

19. The method of claim 18, wherein the plurality of policies comprises at least one of:
   a restriction on hate-based speech;
   a restriction on harassment;
   a restriction on defamation;
   a restriction on racist content; or
   a restriction on incitements to violate at least one of a standard, an ordinance, a regulation, a statute or a law.

20. The method of claim 18, wherein each of the sets of data further comprises at least one of:
   an image associated with one of a creator or a media program of the creator;
   a title of the media program of the creator; or
   a summary of the media program of the creator.

* * * * *